United States Patent [19]

Hardy et al.

[11] 4,430,733

[45] Feb. 7, 1984

[54] SWITCHING OF DIGITAL SIGNALS

[75] Inventors: John H. M. Hardy, The Hague, Netherlands; Robert E. Barrett, Ipswich; Anthony R. Allwood, Woodbridge; Garth I. Riley, Ipswich; John Hovell, Ipswich; Donald W. Smith, Ipswich; Arthur R. Potter, Saxmundham; Ian W. Lowrie, Ipswich, all of England

[73] Assignee: Post Office, London, England

[21] Appl. No.: 959,181

[22] Filed: Nov. 7, 1978

[30] Foreign Application Priority Data

Nov. 7, 1977 [GB] United Kingdom ............... 46296/77

[51] Int. Cl.³ .......................... H04J 3/12; H04Q 11/04
[52] U.S. Cl. .................................... 370/110.1; 370/66
[58] Field of Search ......... 179/15 AT, 15 BY, 18 FL; 370/110, 63, 66, 110.1, 58

[56] References Cited

U.S. PATENT DOCUMENTS 3,997,728 12/1976 Duquesne ....................... 179/15 BY Primary Examiner—Douglas W. Olms
Attorney, Agent, or Firm—Cushman, Darby & Cushman

[57] ABSTRACT

A digital switching device of the stored program type operating under the control of a central control unit has a first stage which multiplexes digital signals from a plurality of line units and separates data signals from signalling information. The data signals are fed to an input time switching stage. The input time switching stage operates under the control of the central control unit to transmit signals from an input port in a particular time slot on a highway to an output time switching stage. The output time switching stage transmits the data signals to the first stage which combines them with signalling information and after demultiplexing transmits them to appropriate ports.

24 Claims, 27 Drawing Figures

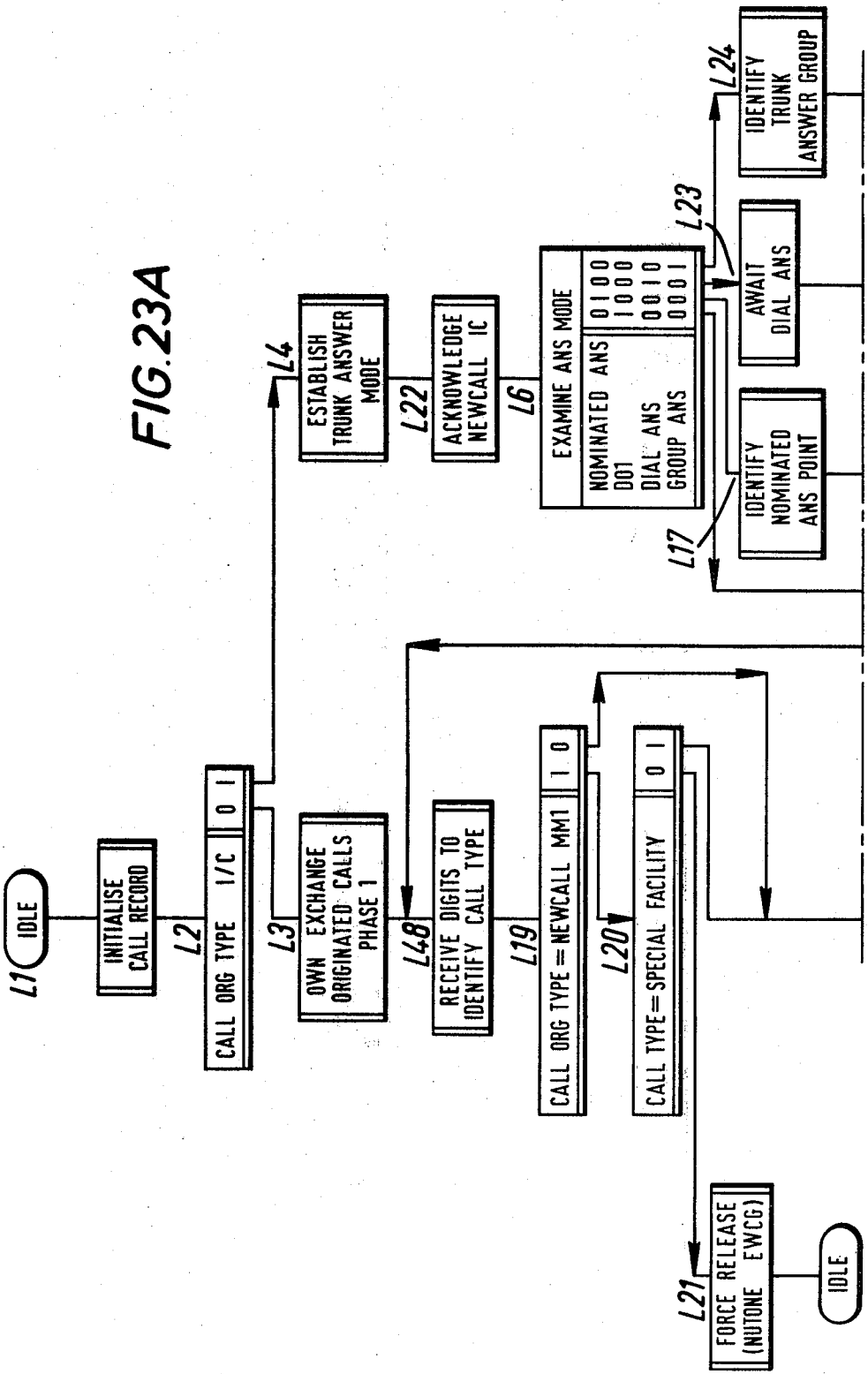

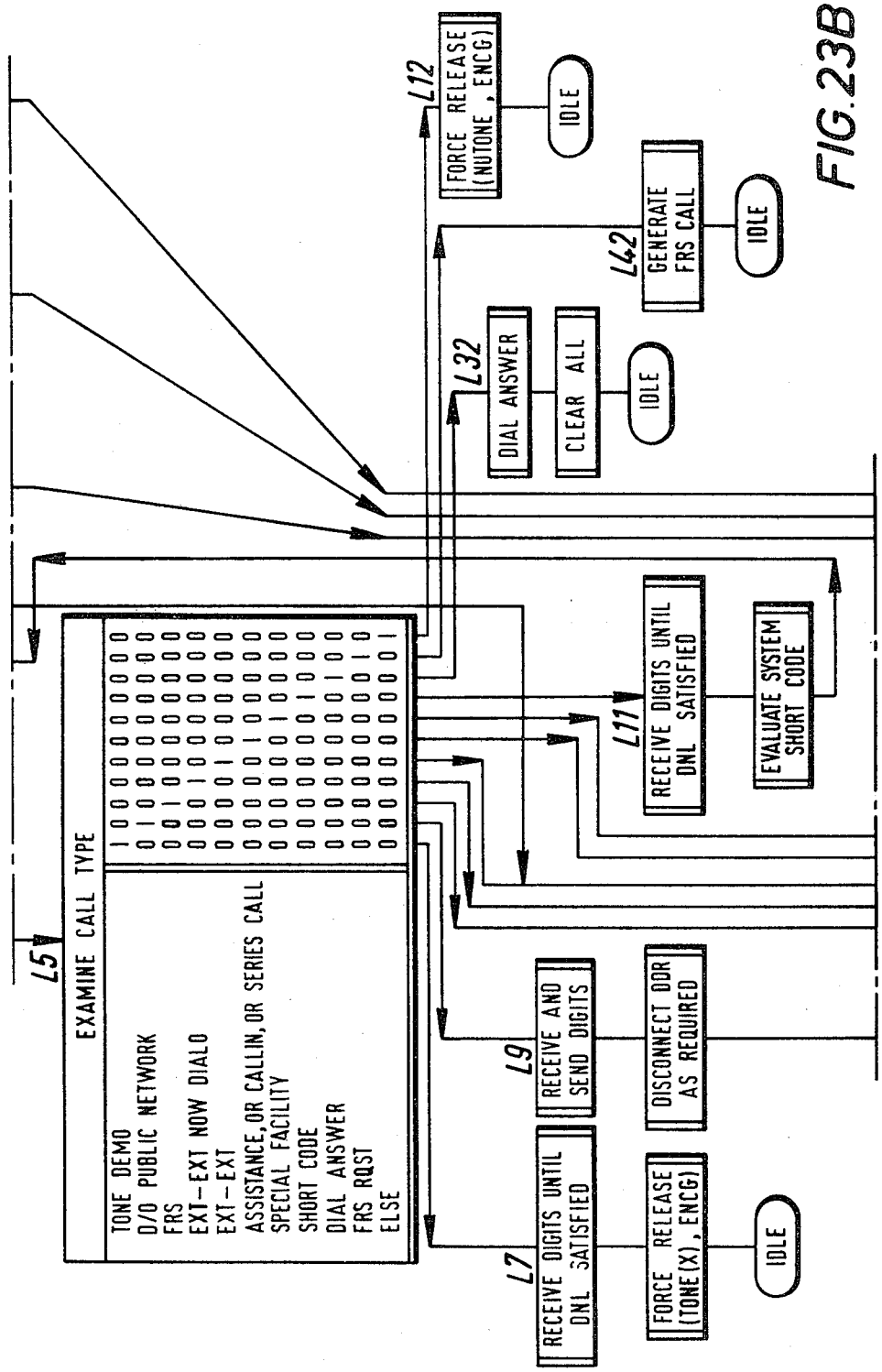

SWITCHING OF DIGITAL SIGNALS

DESCRIPTION

This invention relates to the switching of digital signals. The invention has application to the switching of pulse code modulated (PCM) signals. The invention also relates to a digital switching device which can be used as a PABX (Private Automatic Branch Exchange) telephone exchange. This application is related to the co-pending commonly assigned application of Hardy et al, Ser. No. 959,182, filed Nov. 7, 1978.

PABX's employing digital switches which operate under the control of a stored program type central control unit such as a microprocessor are known. Such devices have a plurality of ports which take the form of extension line units, exchange line units and miscellaneous equipment such as conference units, detectors and test circuits. The line units include codecs for converting between analogue and digital signals and the digital switch operates to route the digital signals to and from appropriate ports under the control of the central control unit.

The types and relative numbers of the different types of ports vary considerably from installation to installation. An object of the present invention is to provide a digital switching device which can provide for widely varying requirements.

According to the present invention there is provided a digital switching device for switching digital signals under the control of a central control unit, said device comprising a first stage including multiplexing means for multiplexing signals from a plurality of ports, means for separating and combining data signals and signalling information, and demultiplexing means connected to said ports, an input time switching stage arranged to receive multiplexed data signals from said first stage, said input time switching stage being arranged under the control of the central control unit to transmit signals from an input port in a particular time slot on a highway and an output time switching stage for receiving signals from said input time switching stage, said output time switching stage being arranged to transmit signals to said first stage for combination with signalling information and transmission to appropriate ports via said demultiplexing means.

The separating and combining means may comprise a data reformatter section and a signalling reformatter section, each section including random access memory means which are alternately read and written. The data reformatter section and the signalling reformatter section may each comprise a pair of random access memories which are alternately read and written, the arrangement being such that one memory of each pair is read whilst the other is being written.

The multiplexing means may comprise one or more parallel in-serial out shift registers.

The demultiplexing means may comprise one or more serial in-parallel out shift registers.

The input time switching stage may include a data store, a serial to parallel converter connected to the data input of said store, said converter being arranged to receive data signals from said first stage and a connection store operative under the control of the central control unit to provide address signals to said data store whereby data is read out from said data store in said appropriate time slots.

The output time switching stage may comprise a demultiplexer.

The device may include signalling input and output circuits for receiving signalling information from and transmitting signalling information to the first stage, each signalling circuit including memory means accessible by said central control unit.

The device may include a tone generator and conference unit which are connected to the input and output switching stages.

The output time switching stage may include a data store, a parallel to serial converter connected to receive data from said data store, and a connection store operative under the central control unit to provide address signals to said data store to control reading of data from the store, and said device includes a space switching stage intermediate the time switching stages.

In one embodiment of the invention the device comprises a PABX and the data signals are digitised speech samples. The ports include extension line units and exchange line units each of which includes a codec for converting between analogue and digital signals.

The invention will be described now by way of example only with particular reference to the accompanying drawings. In the drawings:

FIGS. 21, 23A, 23B, 23C and 23D are block schematic diagrams illustrating the software structure of the device.

The embodiment of the switching system to be described is a private automatic branch exchange (PABX). The PABX is a stored programme machine which uses an eight bit microprocessor as a central processing unit. Switching between lines, trunks, auxiliary units and an operator console is via pulse code modulation (PCM) techniques. Speech signals are encoded to an A-law representation prior to their transmission to the switch. Switching between parties is accomplished by sending the encoded signals at an appropriate time to a receiving party and reconverting the digital signals to analogue form. Because all the speech signals are digitally encoded before being applied to the digital switch the PABX can send the speech signals directly to a local exchange over a regenerated line system without the need for expensive PCM multiplexing equipment at the PABX location. The PABX has a capacity of 160 ports which typically can comprise 120 telephonic extensions, 24 exchange lines and 16 miscellaneous auxiliaries such as an MF4 detector, inter-pabx or test port circuit, and an operator console interface.

Figure 1:
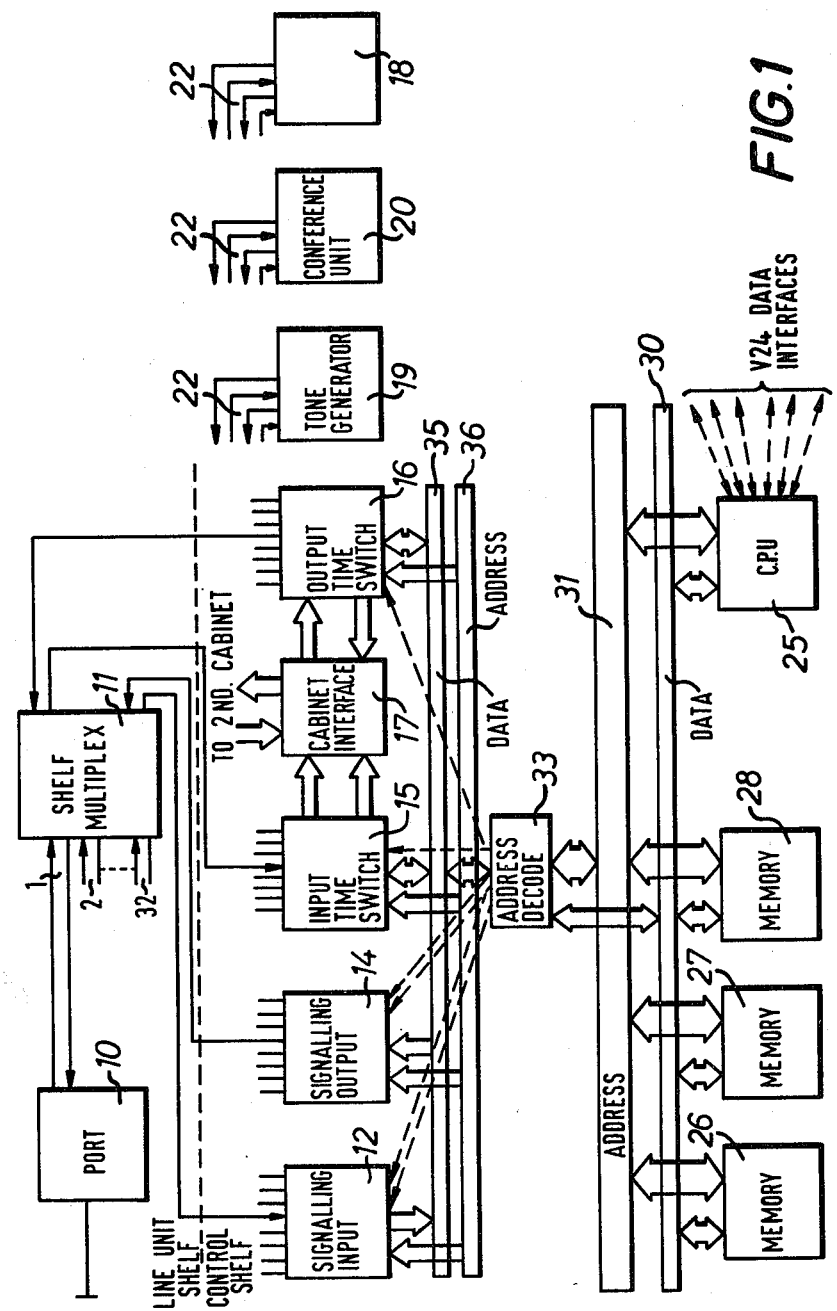
FIG. 1 is a block schematic diagram of a digital switching device in accordance with the present invention.

Referring now to FIG. 1 the PABX has a plurality of line units one of which is indicated at 10. Each line unit is associated with for example a telephonic termination or an exchange line and is arranged to operate synchronously and to produce eight bit PCM samples every 125 usecs. The line units are connected in groups of 32 to shelf multiplex circuits one of which is indicated at 11. Each line unit is connected to its associated shelf multiplex circuit via two lines, one for signals travelling in one direction and the other for signals travelling in the opposite direction. Each shelf multiplex circuit 11 is connected to a signalling input circuit 12, a signalling output circuit 14, an input time switch 15 and an output time switch 16. The input and output time switches are connected via a cabinet interface circuit 17 whose function will be described later.

The PABX has a tone generator circuit 19, a conference unit 20 and a spare card position 18 each of which is linked by highways 22 to the signalling circuits 12 and 14 and to the time switches 15 and 16.

The PABX is controlled by a central processing unit 25 which has associated memories 26, 27, 28. The processing unit 25 and the memories 26 to 28 are linked to the signalling circuit and time switch circuits by data and address buses 30, 31, an address decode circuit 33 and data and address buses 35 and 36.

In each 125 μsec interval the line unit 10 sends to its associated shelf multiplex 11 over an individual wire a group of nine bits, eight of which comprise a speech sample and the ninth of which is part of an eight bit signalling code. The data rate between the line unit 10 and its shelf multiplex circut 11 is thus 72 kbits/sec of combined speech and signalling. The shelf multiplex circuit 11 assembles 32 of the 72 kbits/sec streams in a fixed order onto a digital highway at 2304 kbits/sec and then separates the speech and signalling data for transmission respectively to the input time switch 15 at 2048 kbits/sec and to the signalling input circuit 12 at 256 kbits/sec.

As illustrated in FIG. 1 the central part of the switch is based on a time-space-time structure. This structure is required when two cabinets are required to accommodate all the circuit cards of a switch. For a single cabinet installation a simplification of this structure can be employed consisting of an input time switching stage and an output time switching stage in the form of a demultiplexer. In this case the input time switch 15 receives the 2048 kbits/sec highways from the shelf multiplexes, converts from serial to parallel (8 bits wide) and multiplexes the eight highways for sequential writing into a time switch speech store which comprises a 256×8 bit read/write memory. Of these eight highways five come from the shelf multiplexes while the remaining three come from the tone generator 19, conference unit 20 and spare card position 18. A connection store in the input time switch controls the acyclic reading of information out onto an 8 bit parallel highway into the cabinet interface 17. In a single cabinet installation the cabinet interface merely passes on the 8 bit highway signals to the output time switch circuit 16. The output time switch circuit 16 then demultiplexes the speech channels back onto the eight highways and converts back to serial transmission to the shelf multiplexes 11. The return path through the shelf multiplexes to the line units 10 is simply the dual of the forward path. The single cabinet switch can interconnect any incoming time slot to any outgoing time slot and is non-blocking. This is important since no path searching is required when the control desires to establish a connection through the exchange.

Where a second cabinet is provided to extend the size of the installation the interface 17 comprises a space switching unit and the output time switch 16 is provided with full time switching capabilities. In this case the output time switch is very similar to the input time switch.

The signalling input and output circuits 12, 14 provide a buffering and access capability between the shelf multiplexes 11, conference unit 20, tone generator 19 and the CPU data and address highways 30, 31. The 256 kbits/sec highway carrying 32 signalling channels (8 bits/channel, repetition rate 1 kHz) is used for each access between the signalling circuits and the shelf multiplexes. The structure of the signalling circuits is somewhat similar to the time switching circuits in the way the highways are multiplexed to and from read/write memories. The signalling input circuit has a 256×8 bit read/write memory into which information is written at a 1 kHz repetition rate. This information is then available for reading by the central processing unit 25 at a rate which is independent of the refresh rate. The signalling output circuit 14 also has a read/write memory which holds information to be output onto the signalling output highways, this information being repeated at the 1 kHz rate until updated by the central processing unit 25.

Control for the exchange is provided by the central processing unit 25 through the tri-state buses 30, 31 and associated control lines which permit connection between the CPU 25 and its memories 26 to 28. There are 8 data lines and 18 address lines, the 8 data lines and 8 of the address lines extending to the circuits 12, 14, 15 and 16 through the address decode circuit 33. The address decode circuit 33 decodes the information on the 18 address lines of the bus 31. This arrangement obviates the need for full address decoding.

The memory circuits 26 to 28 are either of the read-only, read-mostly or read/write types. Program information is stored in the read-only memory and the quantities required vary between installations depending on the facilities which are to be provided in the call processing software. The read-mostly memory may be implemented using a read/write memory which is non-volatile to power interruptions and protected against accidental overwriting. Alternatively a form of electrically alterable memory may be used which requires a specific change in the electrical conditions to enable a writing operation to be performed. The read-mostly memory contains information characterizing the installation which requires infrequent updating such as short code dialling data. The read/write memory is used for the volatile customer class of service information which is generally updated from the telephone instrument itself. The read/write memory also contains call record information containing a table for each call in progress giving its present state and history to date.

The central processing unit 25 comprises an Intel 8085 microprocessor and associated input/output interface devices. The microprocessor accesses the main bus system and also has 3 V24 data interfaces for serial data transfer to peripheral equipment. Two of the interfaces are connected via a normal circuit card connector. One of the two interfaces is for communication with a second cabinet whilst the other is for outputting to peripheral units, e.g. a teleprinter, line printer or tape recorder. The third interface is accessed via a connector on the front of a circuit card containing the central processor unit for faultsmans teletype access. The circuit card containing the CPU also contains a watchdog timer which controls the CPU restart and the system fallback to working designated extensions onto certain of the exchange lines in the event of system or power failure. The watchdog is maintained inactive by being triggered every 100 msecs by the CPU. If this trigger disappears the watchdog attempts to restart the CPU by forcing it to the program start-up location. If this is unsuccessful the fallback facility is operated in which relays are energised to connect the designated extensions to exchange lines.

The conference and tone generator circuits 19 and 20 can access the system for signalling and speech highways using the same interface as the multiplexes 11. The conference unit 20 is capable of performing a number of simultaneous conferences with a capacity of up to 32 ports. Signalling to control the conference access is over the highway via the signalling output circuit 14. The tone generator 19 provides supervisory tones only although its design is such that MF tone generators could be added. Each tone generated appears at a given time slot position on the time division multiplexed highway into the switch and the control has only to instruct the switch to connect a given port to a particular tone. If both MF4 and MF5 sending capability is required a second tone generator circuit would be needed.

A clock circuit is provided and contains an exchange crystal oscillator and waveform generation equipment. Provision is made for the exchange oscillator to be slaved from an external clock source for two cabinet operation or where direct digital access to a digital local exchange exists.

Power for the exchange is derived from the mains with a.c. to d.c. converters providing the voltages required by the individual circuits. The power supplies are thermally isolated to a relatively high degree from the main cabinet electronics by using separate ventilation channels.

Figure 2:
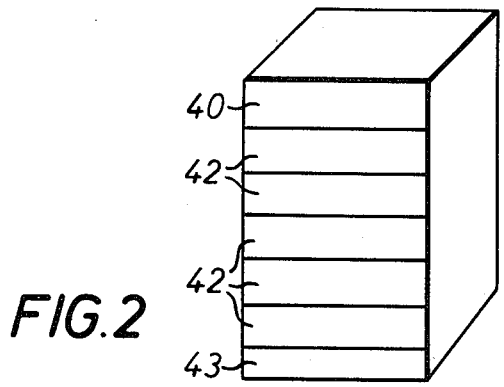
FIG. 2 illustrates the manner in which circuits of the switching device can be arranged on shelves in a cabinet.

The manner in which the circuits are arranged in a cabinet is illustrated in FIG. 2. A shelf 40 designated the control shelf at the top of the cabinet, contains the central processor unit 25 and its associated memories together with the signalling circuits, time switch circuits, tone generator and conferencing unit. Below the control shelf are six shelves 42 identified as line unit shelves. These shelves contain all the line units 10. At the base of the cabinet is the power shelf 43 containing the power unit for the exchange. All the shelves use pre-wired slides and the only connection between shelves is by means of a ribbon cable looping down from the top to the bottom of the cabinet. MDF connections are via plug-in access using a technique which permits rapid on site termination.

Figure 3:
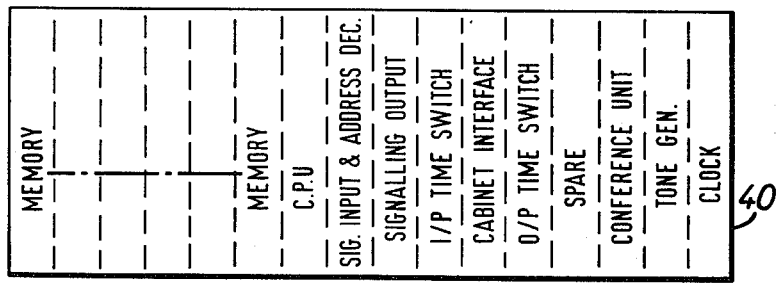
FIG. 3 illustrates the arrangement of circuit cards on the control shelf.

FIG. 3 illustrates the arrangement of individual circuit cards across the control shelf 40 of the cabinet of FIG. 2. A circuit card is provided for the clock circuit, tone generator circuit, conferencing unit, output time switch, cabinet interface, input time switch, signalling output circuit, signalling input and address decode circuit, the central processor unit and the memory circuits. Spare card positions are also provided.

Figure 4:
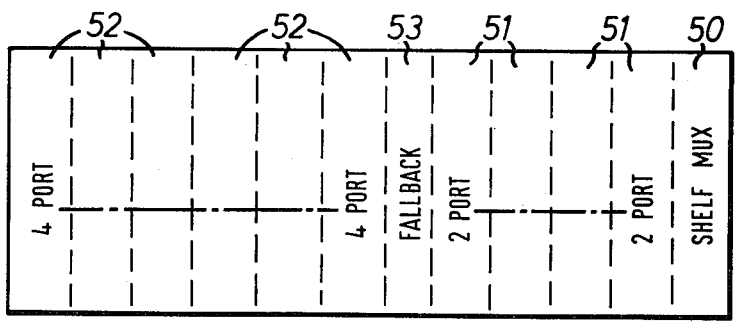
FIG. 4 illustrates the arrangement of circuit cards on a line unit shelf.

A typical line unit shelf arrangement is illustrated in FIG. 4. Each line unit shelf has a shelf multiplex card 50 for the shelf multiplex circuit 11 which provides the access between 32 ports on each shelf and the control and switching circuits of the control shelf. The ports themselves are mounted on cards containing necessary circuitry for 4 or 2 ports. The 2 port cards are indicated at 51 and the 4 port cards at 52. It is envisaged that for a normal rental range PABX application, the 4 port units would be extension line circuits while the 2 port units would comprise exchange line circuits and inter-PABX tie line circuits. The 2 port units may also contain auxiliary equipment requiring analogue access to the exchange such as MF receivers, console interface circuits, recorded announcement machines and testing ports. Fallback relays are mounted on a card 53 located between the 2 port cards and 4 port cards.

Figure 5:
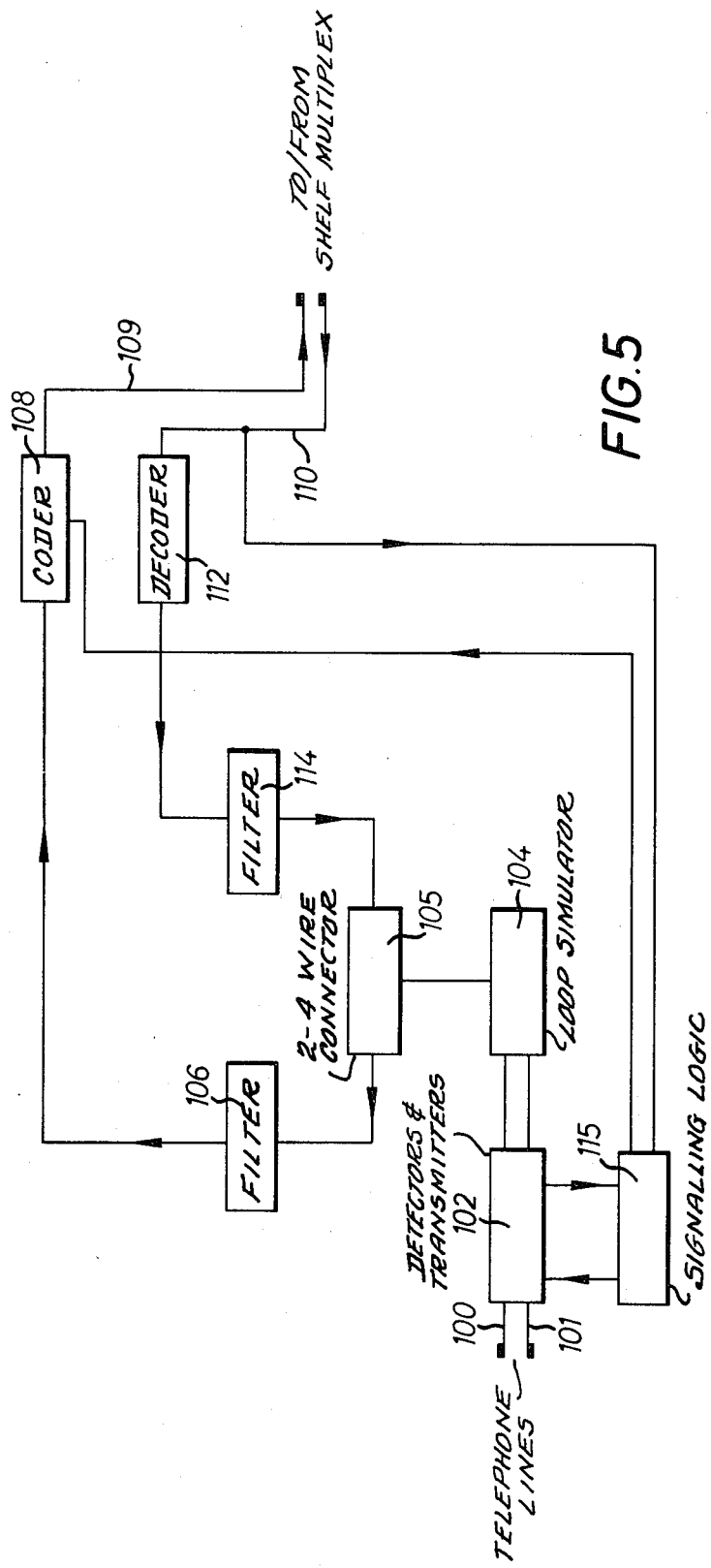
FIG. 5 is a block schematic diagram of an exchange line unit.

FIG. 5 shows schematically an exchange line unit which constitutes one form of port 10. The exchange line unit is connected by a pair of telephone lines 100, 101 to a telephone exchange. The lines 100 and 101 are connected to a circuit 102 which contains detectors and transmitters. The circuit 102 is provided to detect the application of ringing, to monitor a loop state and to detect the application of an exchange equipment released signal at the public exchange during clear down. Relays are provided to transmit signalling (e.g. calling earth, digit pulses) to the public exchange and to cause the detectors to be applied in various combinations at different stages of a call. The circuit 102 is connected to a loop simulator 104 which in turn is connected to a two-wire to four-wire converter 105. The two-wire to four-wire converter 105 has an output connected via a filter 106 to a coder 108 the output of which is fed via line 109 to the shelf multiplex.

Signals can be received from a shelf multiplex 11 via a line 110 which is connected to a decoder 112. The decoder is connected via a filter 114 to the two-wire to four-wire converter 105.

The circuit also includes signalling logic 115 which is connected to the circuit 102 and to the coder 108 and to the line 110.

The loop simulator 104 comprises operational amplifiers, transistors, resistors and capacitors and is arranged to simulate the loop state of a termination by a constant current sink.

The signalling logic 115 is provided to interface between individual detectors, transmitting circuitry and signalling structure. The detector states have to be statisised prior to serial transmission and multiplexed in with the speech digits while in the reverse direction the logic decodes the statisised states for operating the transmitting relays and signalling the digits to be pulsed. The pulsing out is controlled on each line unit by a binary to phone pulse converter thereby relieving the central processing unit of the detailed timing.

The coder 108 is arranged to produce A-law PCM samples on the line 109, these samples representing speech signals received on the lines 100 and 101. These samples are then fed to the switch for processing.

Figure 6:
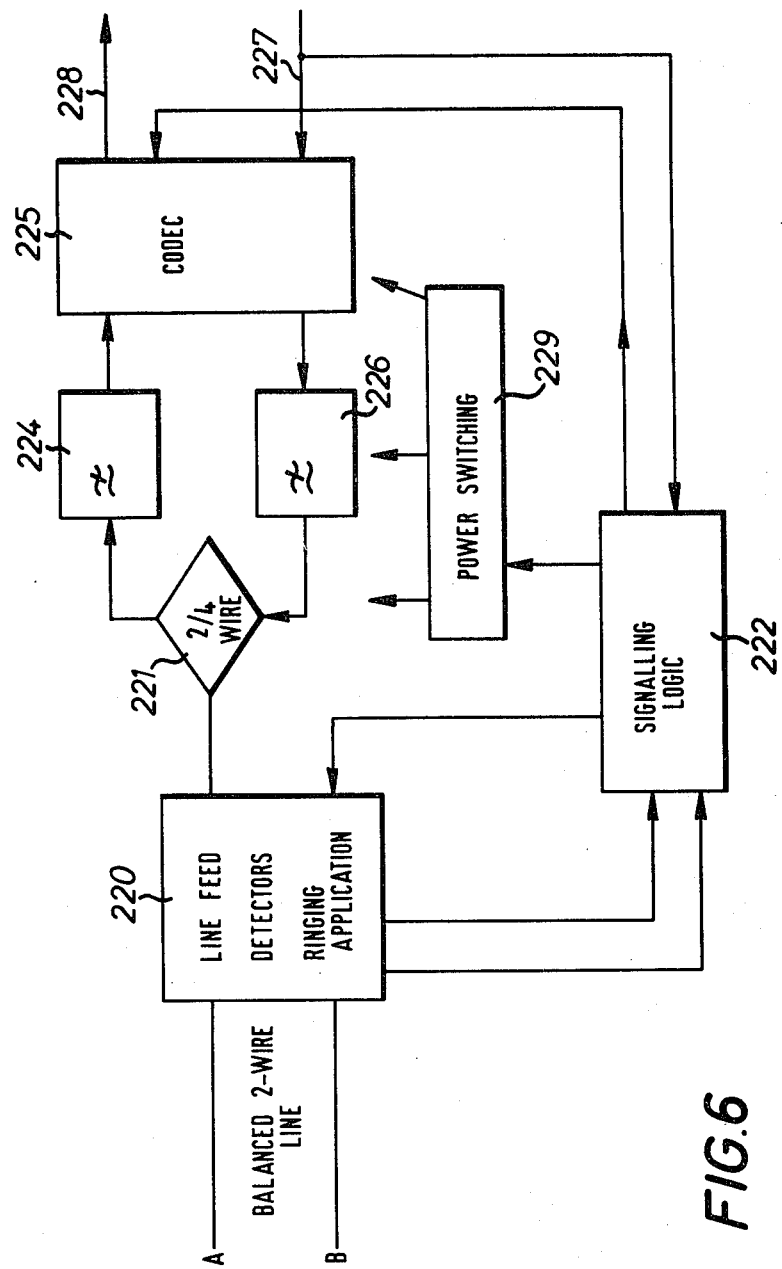
FIG. 6 is a block schematic diagram of an extension line unit.

An extension line unit is shown schematically in FIG. 6. The line unit provides an interface between two-wire lines from dial or MF telephones and the 72 kbits/sec digital highways into the shelf multiplexes 11. Four such line units are provided on a single plug-in circuit card.

The line unit comprises a circuit 220 which includes line feed circuits, loop detectors and ringing application circuits. The circuit 220 is connected to a two-wire to four-wire converter 221 and to signalling logic 222. The two-wire to four-wire converter 221 is connected via a filter 224 to a codec 225 and a return path to the filter 224 from the codec 225 is provided via a filter 226. The codec 225 is arranged to produce A-law samples representative of incoming analogue speech signals and to transmit the coded samples to the shelf multiplex 11 via line 228. The codec also receives coded samples from the multiplex 11 via line 227 and decodes these samples to produce analogue signals for transmission to the telephone instrument. The codec is described in detail in U.K. patent application No. 5014/77.

The signalling logic 222 has output lines connected to the circuit 220, a power switching circuit 229 and to the codec 225. The power switching circuit 229 is arranged to disconnect power from the converter 221, filters 224, 226 and the codec 225 when the line unit is not in use thereby conserving power.

Figure 7:
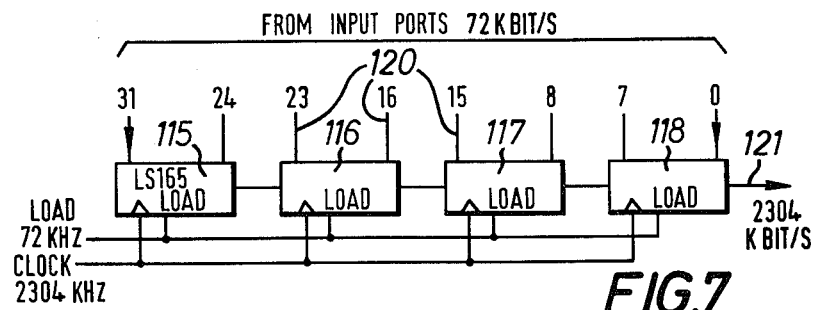
FIGS. 7 to 9 are block schematic diagrams illustrating a shelf multiplex circuit.
Figure 8:
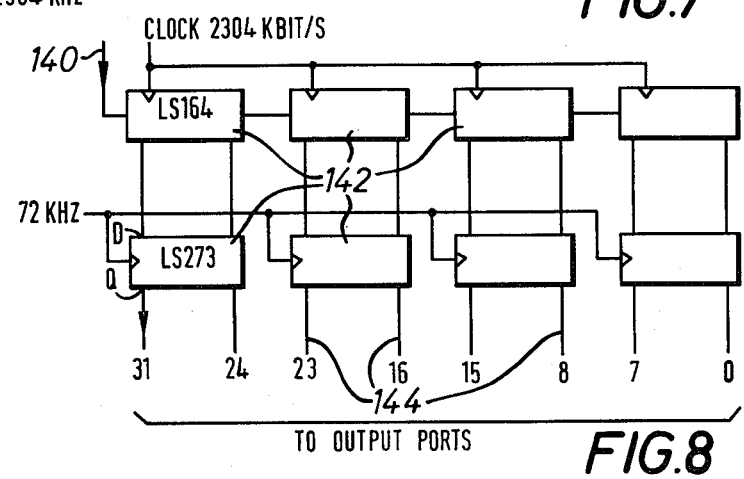
Figure 9:
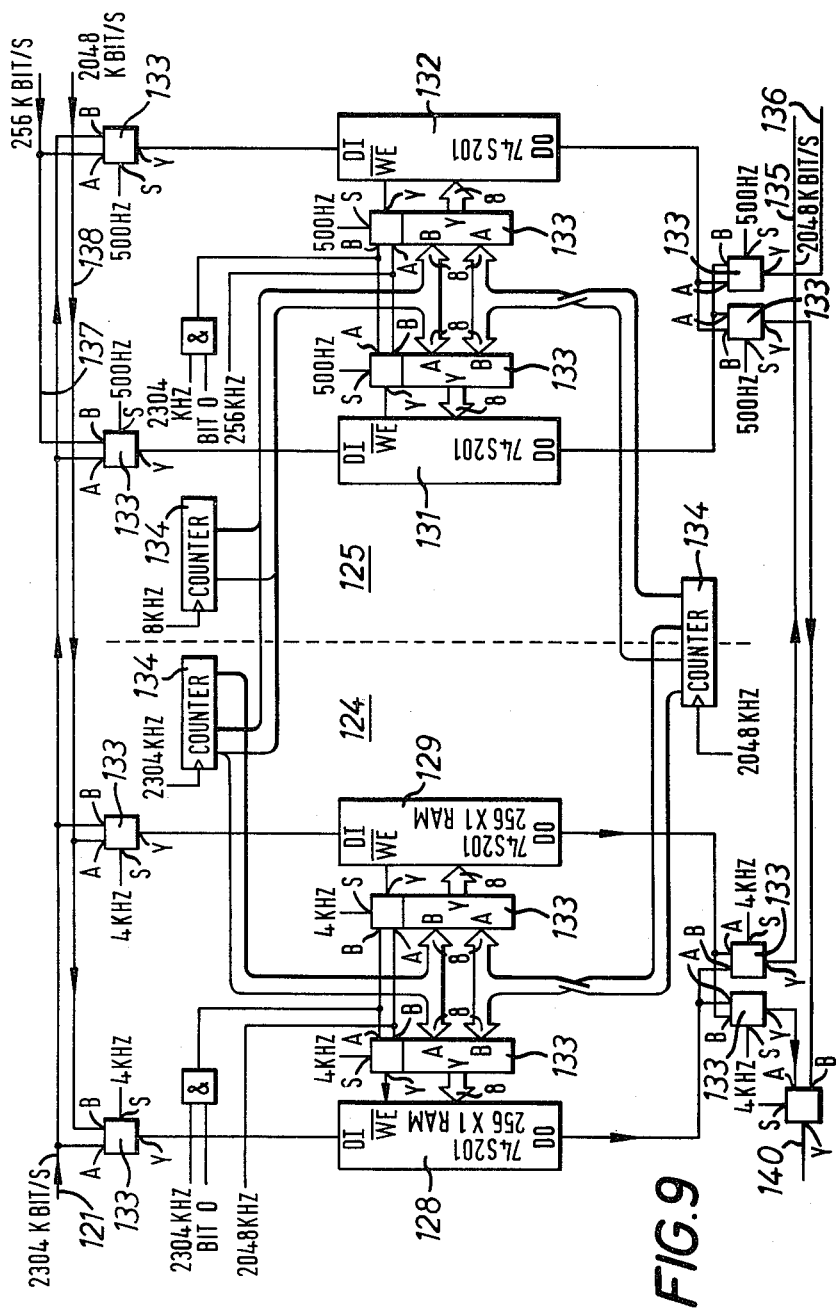

An example of a shelf multiplex circuit 11 is illustrated in FIGS. 7, 8 and 9. Each circuit 11 comprises a multiplexer stage, a demultiplexer stage and a speech and signalling reformatter. The multiplexer stage is illustrated in FIG. 7 and comprises four parallel input-serial output shift registers 115 to 118 arranged to receive the coded inputs from 32 line units on lines 120. The serial output of the multiplexer appears on line 121 and is fed to a reformatter illustrated in FIG. 9. The output on line 121 comprises a 2304 kbits/sec stream. Referring now to FIG. 9 the reformatter separates the speech and signalling information and has a speech reformatter section 124 and a signalling reformatter section 125. The sections 124 and 125 are substantially identical the main difference being in the rates at which they operate. Each comprises a pair of 256×1 bit random access memories 128, 129 and 131, 132 and associated data selectors 133 and counters 134. Reformatting and rate changing to give byte-interleaved speech and signalling is achieved by alternately reading and writing the RAMS 128, 129, 131, 132. Speech data at 2048 kbits/sec appears on line 135 and signalling data at 256 kbits/sec appears on line 136 for transmission to the input time switch 15 and signalling input circuit 12 respectively of FIG. 1.

Reformatting is performed separately for encoded speech and signalling although each reformatter is a bidirectional device. This is made possible due to the clock speed required at this point in the switch (2 MHz). In order to perform switching with a 256 time slot multiplexer at the centre of the switch it is necessary to convert to byte-interleaved multiplex prior to serial-parallel conversion. This requires a frame of storage per channel in order to ensure byte integrity. This storage is housed on a per-shelf basis on the shelf multiplex card. Each reformatter circuit operates as a swinging buffer with one store being written while the other is being read. This is necessary due to the different writing and reading clock rates.

The input from the multiplexer on line 121 is at a data rate of 2304 kbits/s. During bit 0 time the 32 signalling digits of the 32 associated ports are written into one of the two signalling stores 131, 132 under control of a counter clocked at 2304 kHz. Prior to performing each write operation the addressed location is read and the signalling digit contained therein inserted in the outward direction of transmission to the demultiplexer on line 140. Meanwhile the other signalling store is being read at a digit rate of 256 kbits/s under the control of a counter which is clocked at 256 kHz. Immediately after each read operation signalling from the central signalling output circuit 14 is written into the same location and stored for subsequent output to the demultiplexer in the succeeding signalling frame. Encoded speech is dealt with in a similar manner to the signalling except that the control address for input/output to the central switch is provided by a counter clocked at 2048 kHz.

The reformatter can receive signalling information from the signalling output circuit 12 via a line 137 and speech data information from the output time switch via a line 138. In this receive direction the information is treated in a similar manner, the speech data and signalling data being reformatted and combined and fed along line 140 at 2304 kbits/sec to a demultiplexer illustrated in FIG. 8. It will be noted that the same RAMS are used for both the send and receive directions in a read-before-write mode.

Referring to FIG. 8 the demultiplexer comprises eight serial input-parallel output shift registers 142 which are arranged as shown. The demultiplexer receives the 2304 kbits/sec stream from line 140 and demultiplexes this stream to provide outputs on 32 output lines 144 which are connected to the 32 line units associated with the shelf multiplex circuit.

A subsidiary function of the shelf multiplex circuit 11 is to distribute various waveforms required by the line units. These signals are received from a clock circuit and buffered on the shelf multiplex before being bussed along the line unit shelf.

Figure 10:
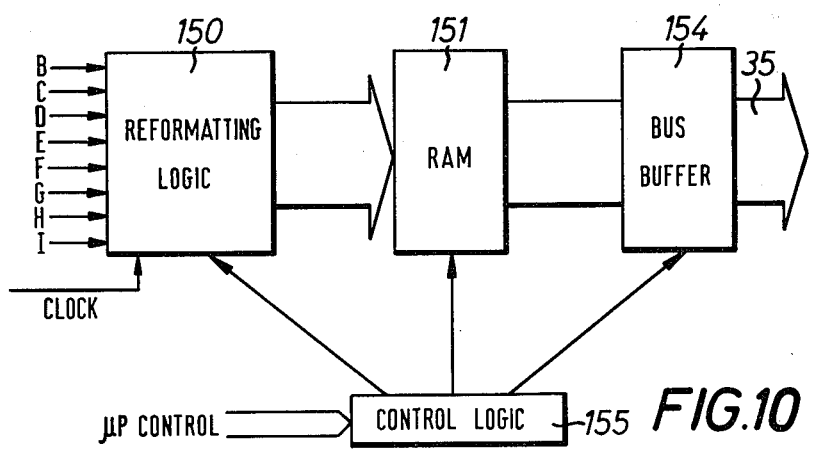
FIG. 10 is a block schematic diagram of a signalling input circuit.

A schematic illustration of a signalling input circuit 12 is shown in FIG. 10. The circuit comprises reformatting logic 150 which has inputs identified as B, C, D, E and F which are connected to shelf multiplex circuits 11. The logic 150 has three further inputs G, H, I which are connected respectively to the conference unit 20, the tone generator 19 and the spare card 18. The reformatting logic is connected to a random access memory 151 the output of which feeds a bus buffer 154 which feeds the microprocessor data bus 35. The circuits 150, 151, 154 are controlled by control logic 155 which operates under the control of the microprocessor.

The reformatting logic 150 receives the 256 kbits/sec signalling stream from line 136 of each line unit shelf multiplex 11 on the lines B, C, D, E, F and feeds the data into the RAM 151. The RAM can then be accessed as required from the microprocessor bus either directly from the main CPU or from a signalling preprocessor. Signalling to and from the line unit shelves is in byte inter-leaved serial streams at 256 kbits/sec, 8 bits per byte. Each line unit sends and receives one byte of data each msec so that the contents of the RAM 151 are continually being updated.

The data is stored in the RAM 151 in port order for each shelf and the data for the shelves is in turn in numerical sequence. Thus the first port on the first shelf is addressed as port X+0, the next as X+1 etc up to the last port shelf 7 which would be X+255. X is the start address of the storage area. It should be noted that five shelves are normally the maximum implemented the remaining three inputs to the signalling input circuit could be made available at little cost for other purposes.

The control logic 155 has to ensure that no data is lost during transfer into the RAM 151 owing to microprocessor access and also that the microprocessor access is reasonably fast. To achieve this the basic clock rate of 256 kbits/sec is used to control RAM access. During the first half cycle (~2 μsec) any waiting request for access by the microprocessor is allowed and completed before the second half cycle during which a single data byte is written into the RAM. By this means the microprocessor access time can be shown to be between 1 μsec and 5 μsec with an average of 3 μsec. The minimum access time is governed by the characteristics of the RAM actually used.

Figure 11:
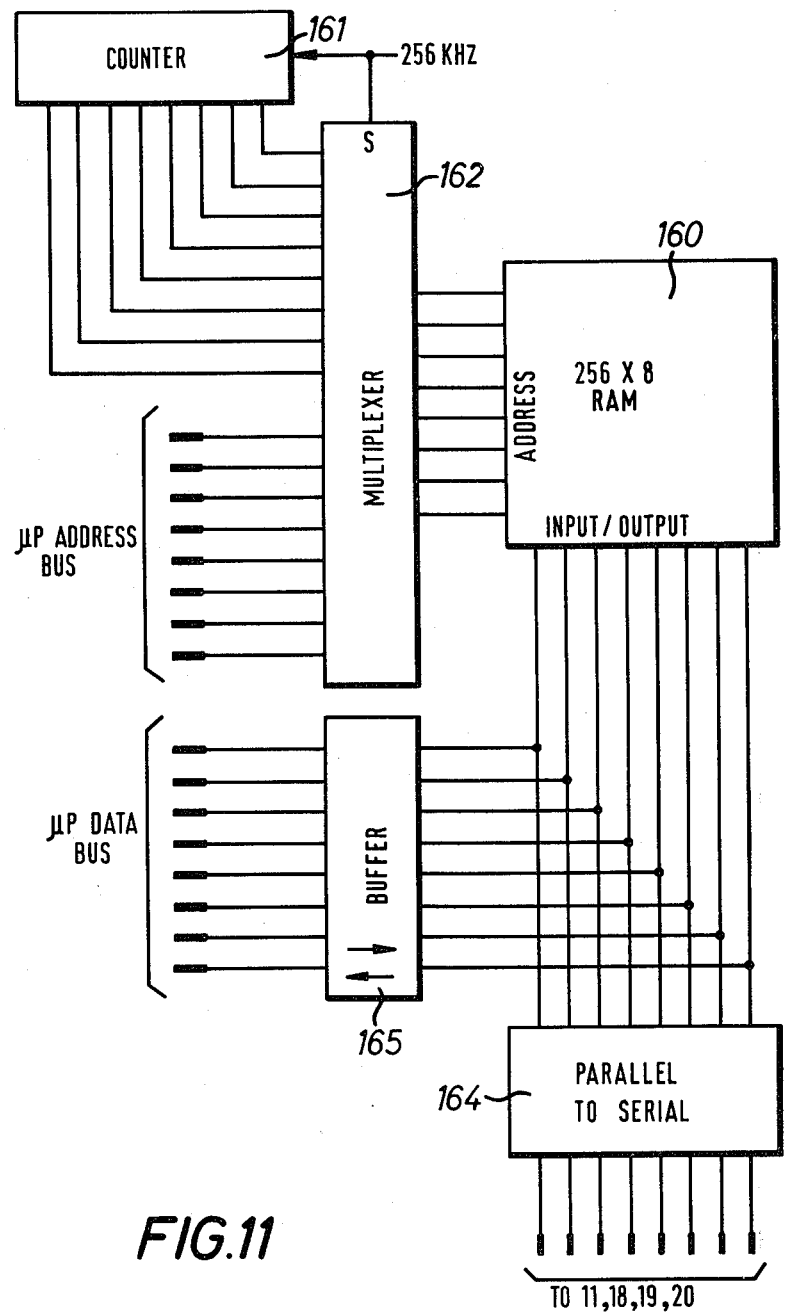
FIG. 11 is a block schematic diagram of a signalling output circuit.

An example of a signalling output circuit 14 is shown in FIG. 11. The circuit has a 256×8 bit RAM 160 which can receive address signals from a counter 161 via a multiplexer 162. The counter 161 is clocked at 256 kHz. The RAM can also receive address signals from the microprocessor address bus 36 via the multiplexer 162. The data input/output of the RAM 160 is connected to a parallel to serial converter 164, the lines between the RAM and the parallel serial converter also being connected via a buffer 165 to the microprocessor data bus 35. The outputs of the converter 164 are connected to the shelf multiplexes 11. the circuit shown in FIG. 11 processes signalling information in the out-going direction i.e. from the microprocessor to the line units of the exchange. Each of the 256 ports receives 8 bits of data every 1 msec, this information being stored in the read-write memory 160 which has a location for each port. Data is continually read from this memory converted from parallel to serial via the converter 164 and sent to each shelf multiplex at 256 kbits/sec for onward transmission to the appropriate line unit.

On alternate half cycles of the clock provided by the counter 161 the address and data lines are changed over making the memory available to the microprocessor for new information to be written. Facilities are also provided for reading back the data for checking purposes, so that, to the microprocessor, the circuit card appears as a conventional read-write memory.

Figure 12:
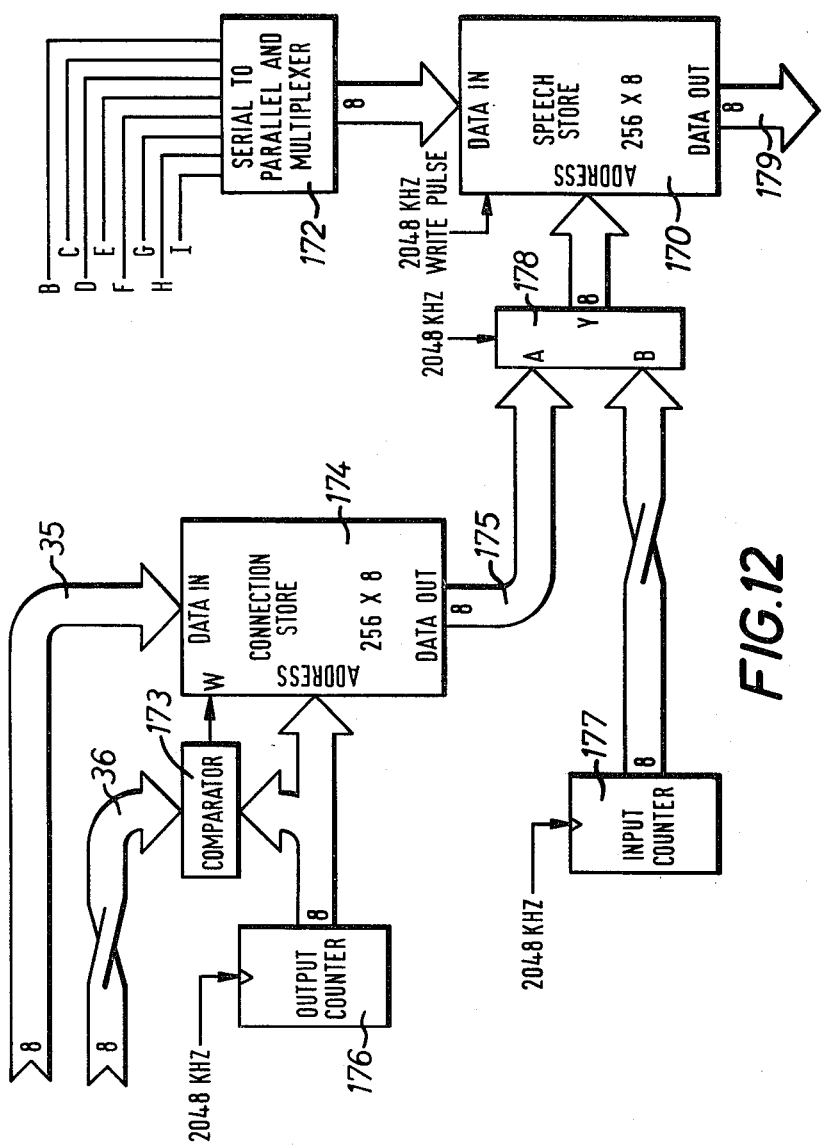
FIG. 12 is a block schematic diagram of an input time switch.

The input time switch 15 is shown in more detail in FIG. 12. The input time switch has a speech store 170 consisting of a 256×8 bit random access memory. The speech store 170 receives the speech data from the shelf multiplexes via lines identified as B, C, D, E and F and a serial to parallel and multiplexer circuit 172. The tone generator 19, conference unit 20 and spare card 18 are also connected to the speech store via the circuit 172. The input time switch also has a connection or control store 174 which also consists of a 256×8 bit RAM. The connection store 174 is arranged to receive data from the microprocessor data bus 35. The store 174 can be addressed from the microprocessor address bus 36 and an output counter 176 which operates at 2048 kHz. The write signal for the connection store 174 is provided by a comparator 173 which compares the output of the counter 176 with the signal on the address bus 36. The data output highway of the store 175 is connected via an 8×2:1 data selector 178 which is clocked at 2048 kHz to the address of the store 170. The address of the store 170 is also connected to a counter 177 via the selector 178. The data output highway 179 of the speech store 170 is connected to the output time switch 16 via the cabinet interface 17 shown in FIG. 1.

In operation digital speech signals from each of the five shelf multiplexes in the system, together with tone generator signals and conference unit signals and any signals from spare card position are multiplexed and converted from serial to parallel form by the circuit 172. The 8 wire highway between the circuit 172 and the speech store 170 carries parallel speech samples from all 256 ports of a cabinet of the exchange and because of the fixed order of multiplexing prior to this point the speech sample from a particular port always appears in the same time slot. The output highway 179 for the speech store 170 carries the speech samples in the outgoing direction. In this case information in a given time slot will always be transmitted to a given port of the switch via the cabinet interface 17, output time switch 16 and shelf multiplex.

Speech samples on the highway between the circuit 172 and the store 170 are written cyclically into the speech store 170 under the control of the counter 177 clocked at 2048 kHz. The store 170 therefore holds an 8 bit speech sample from every port in the exchange. A connection in the switch is made by reading out the required sample from the speech store onto the highway 179 during the time slot associated with the destination port. Time switching is achieved by reading the contents of the speech store 170 under the control of the cyclic connection store 174. This store contains connection codes which have been supplied from the central processor unit 25. While the speech store 170 is being written the same address from the counter is applied to the connection store 174 which performs a read operation. The time slot code obtained is staticised in a latch and applied to the speech store address during the following half cycle of the 2048 kHz clock. The speech store performs a read operation using this address data and outputs the speech sample to the interface 17.

The connection store 174 is used to indicate which speech sample should be read during each of the time slots of the highway 179. A new connection in the switch is set by the microprocessor changing the information in the connection store 174. The equipment number of the originating port is written into the connection store at the location corresponding to the destination port number. Data is written into the connection store 174 by placing an external time slot code into a latch and an internal time slot code into another latch. When the output of the counter 176 corresponds to the internal time slot code, the comparator 173 causes the external time slot code to be written into the connection store 174.

For maintenance purposes the microprocessor is arranged so that it can also read back the information in the connection store to check its validity.

Figure 13:
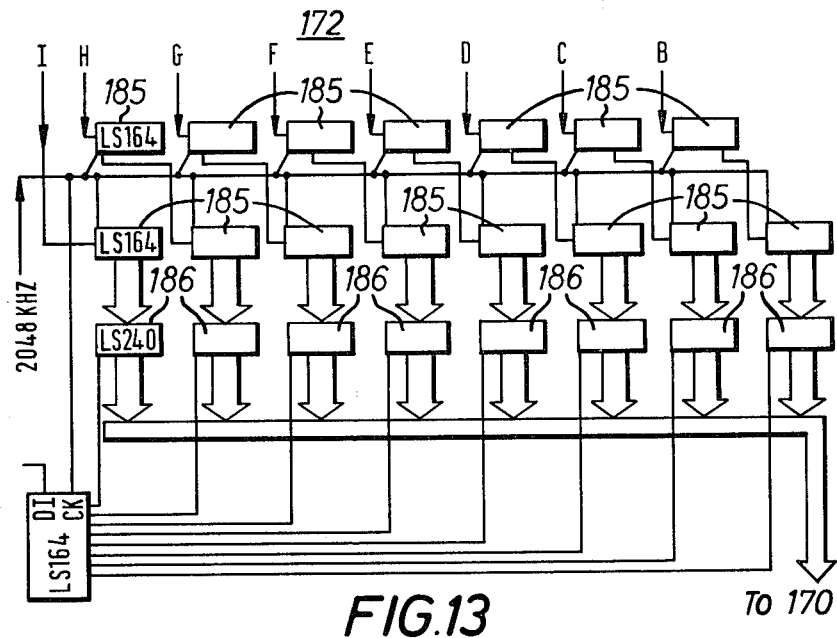
FIG. 13 is a schematic illustration of a serial to parallel converter and multiplexer used in the time switch of FIG. 12.

The serial to parallel converter and the multiplexer circuit 172 can be realised using a plurality of serial input-parallel output shift registers 185 and a plurality of tri-state gates 186 as shown in FIG. 13.

Figure 14:
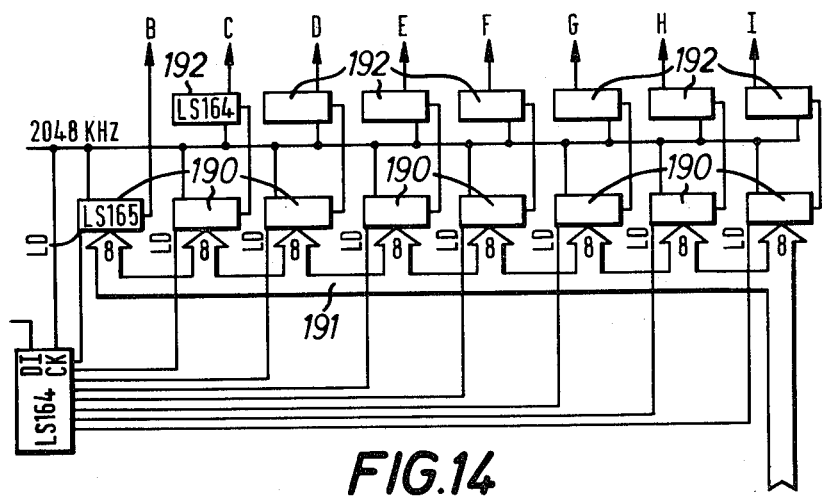
FIG. 14 is a schematic illustration of one form of output time switch.

The single cabinet version of the output time switch 16 is shown schematically in FIG. 14. In this version the output time switch 16 is a demultiplexer which comprises eight parallel input-serial output shift registers 190 arranged to receive data from the input time switch on highway 191 via the cabinet interface 17. The highway 191 feeds the eight parallel to serial shift registers 190 which are loaded in turn to take 8 samples from the highway. The data is clocked out serially from the registers 190 and after equalisation in a delay, which comprises seven serial input-parallel output shift registers 192, is fed out to the shelf multiplexes, conference and tone generator and spare card positions. It will thus be seen that the output time switch converts the 8 wire highway from the cabinet interface 17 from parallel to serial form and demultiplexes to feed the individual shelves of the exchange cabinet or cabinets. No switching function is required for the single cabinet version of the output time switch although for two cabinet models extra time switching circuits can easily be added to the output time switch circuit card.

Figure 15:
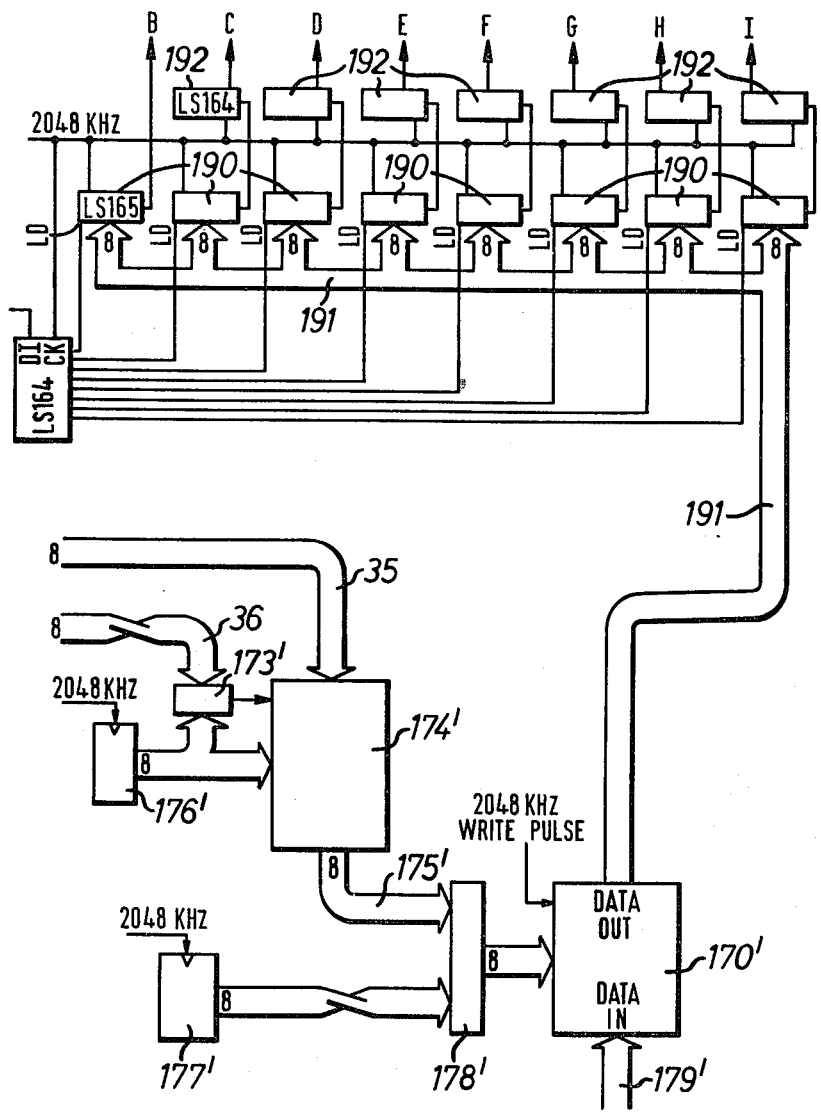
FIG. 15 is a block diagram illustrating another form of output time switch.

The two cabinet version of the output time switch is shown in FIG. 15. It comprises an output stage 198 which is identical to the arrangement shown in FIG. 14. In this two cabinet version the highway 191 is connected to a time switching stage which is essentially the inverse of the input time switch shown in FIG. 12. The output time switch has elements corresponding to those of the input time switch and these are indicated by corresponding reference numerals. The output time switch carries out functions which are the converse of those carried out by the input time switch and so its operation will not be described in detail.

Figure 16:
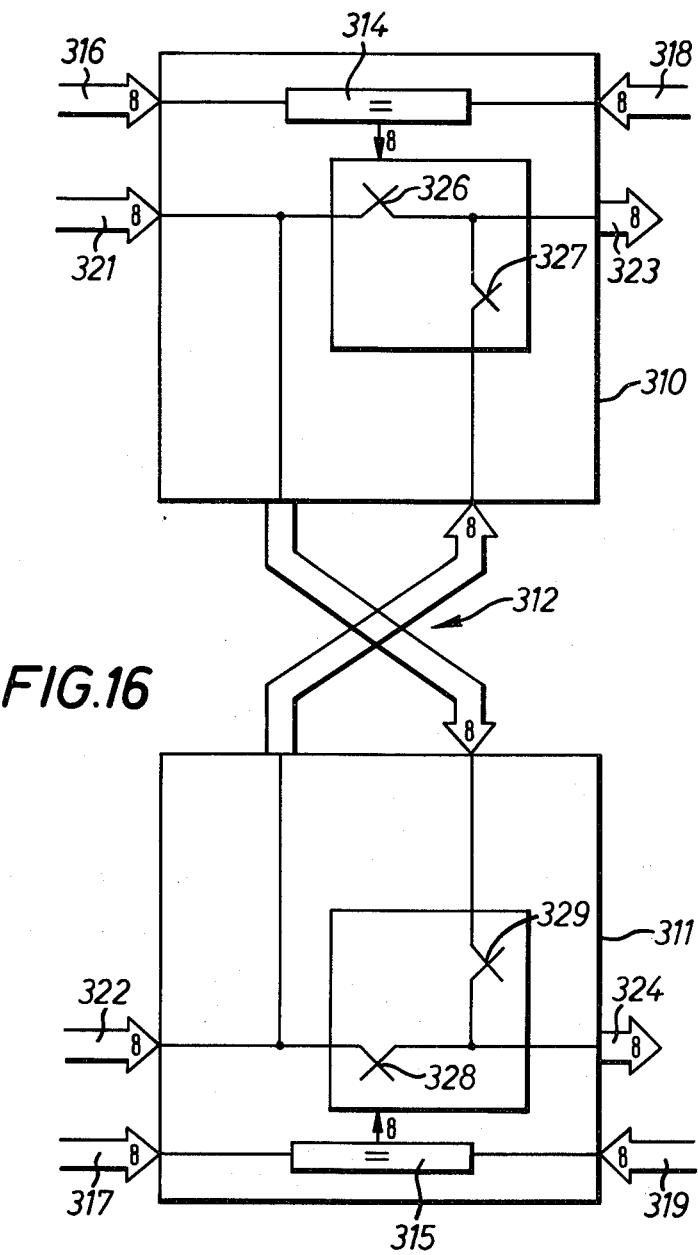
FIG. 16 illustrates an interface unit when implemented as a space switch.

In the two cabinet version of the switch the interface unit 17 comprises a space switching stage and is shown in FIG. 16. Each cabinet has an interface unit 310, 311, the interface units being connected by cabling 312. Each interface unit has a comparator 314, 315, each comparator being connected to the connection store of its associated input time switch 15 by highway 316, 317, and to the connection store of its associated output time switch 16 by highway 318, 319. Each interface unit is also connected to the speech store of its associated input time switch by a highway 321, 322, and to the speech store of its associated output time switch by a highway 323, 324. The interface unit 210 can connect the highway 321 to either the highway 323 or the highway 324. Similarly the interface unit 311 can connect the highway 322 to either the highway 323 or to the highway 324. The connection is made via crosspoints 326, 327, 328, 329 which comprise LS157 integrated circuits. The decision as to which connection is made is determined by the comparators 314, 315 each of which compares the contents of the connection store of its associated input time switch with the contents of the connection store of its associated output time switch. If the contents of the stores are dissimilar this indicates that the ports to be connected are on the same cabinet whilst if they are identical this indicates that the ports to be connected are in different cabinets. In the first case crosspoints 327, 329 are operated and in the second case crosspoints 326, 328 are operated. The reason is that for a given two-way connection the crosspoints 327 and 329 can be operated during the same time slot whereas a same cabinet call accessed by addressing that number. It is possible to have 32 different tones all provided simultaneously by the tone generator.

Figure 17:
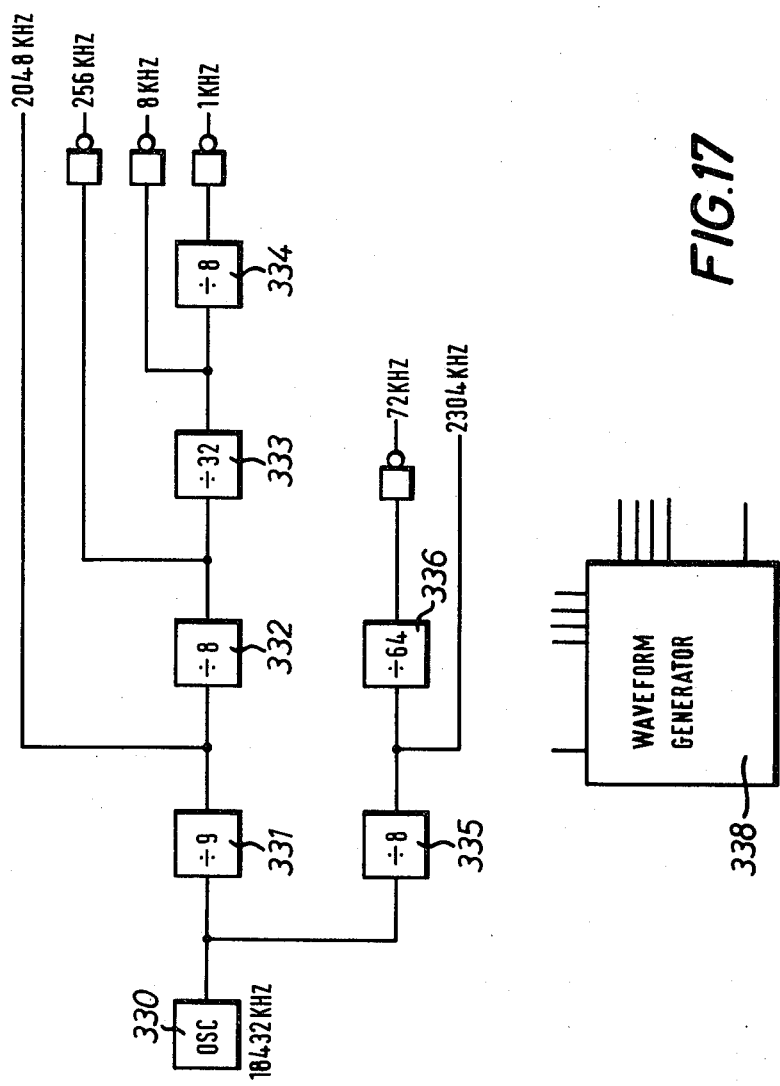
FIG. 17 is a block schematic diagram of clock circuitry.

A clock circuit card is also provided to generate and buffer the waveforms required by the digital switch. The clock is shown in block form in FIG. 17. The clock comprises a crystal oscillator 330 which operates at 18,432 kHz to provide a master timing reference and all basic frequencies are derived from this signal using divider circuits 331, 332, 333, 334, 335 and 336. Additional circuitry indicated at 338 produces the desired waveforms from these frequencies.

The address decode circuit 33 comprises a decode matrix (e.g. 74LS138) which operates on the eight most significant bits on the address bus 31 to provide enable signals to the signalling circuits 12, 14 and the time switching circuits 15, 16.

Figure 18:
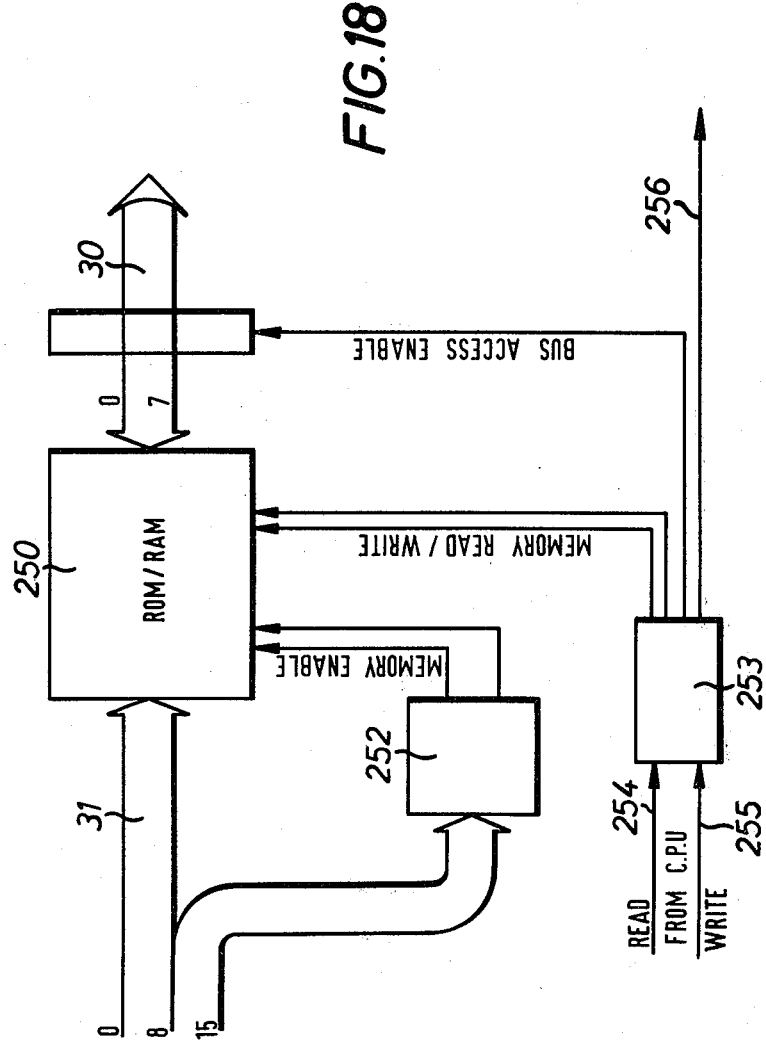
FIG. 18 is a block schematic diagram illustrating the memories associated with the central processing unit.

An example of a memory circuit 26, 27, 28 is shown in FIG. 18. The memory has a ROM/RAM 250 which is connected to the address bus 31 and the data bus 30. An address decode logic 252 provides enable signals for the ROM/RAM 250. The memory circuit also has a memory read/write control logic 253 which receives read signals and write signals requires the particular 326, 328 crosspoint to be operated for two time slots. This method of operation obviates the need for an additional crosspoint control store.

It will thus be seen that the space switch does not need to be accessed from the processor and is controlled by means of the following algorithm.

If a call is to be set up between line unit ports on different cabinets then both directions of transmission use the same internal time slot. If the ports to be connected are both in the same cabinet two different internal time slots are used. In the first case the contents of the connection stores in the input and output time switches of a cabinet will be identical for that time slot and in the second case they will differ. This comparison is used to operate the space switch for either "own cabinet" or "other cabinet" connection.

The tone generator indicated at 19 in FIG. 1 is used to generate all the supervisory and MF tones required for a particular exchange. The tones are digitally generated using read-only memories storing the tone samples and cadencing information. The tone generator interfaces to the input time switch in the same way as each shelf multiplex. This means that each tone has its own port number and can be from the CPU 25 on lines 254, 255 and decodes these signals to provide read/write signals for the ROM/RAM 250. The logic 253 also sends transfer acknowledge signals to the CPU 25 on line 256.

Each of the memory circuits 26, 27, 28 has the basic layout shown in FIG. 18, the main difference between the circuits being the relative amounts of ROM and RAM provided in the block 250.

Figure 19:
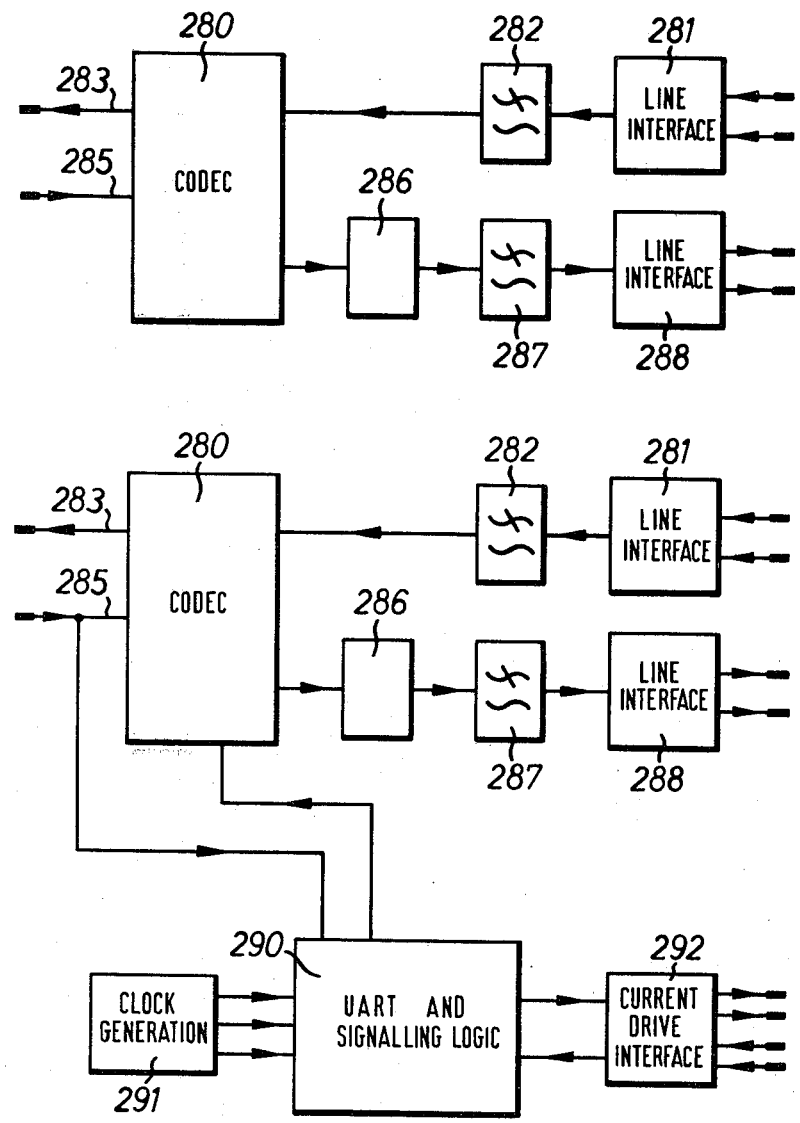
FIG. 19 is a block schematic illustration of a console line unit.

The PABX has an operator's console and access between the console and the switch is via a console line unit which is housed on two line unit cards. The console line unit is shown schematically in FIG. 19 and essentially comprises two sections one of which handles speech signals and the other signalling information.

The speech section has two identical circuits each comprising a codec 280 which is arranged to receive analogue signals from the console via a line interface 281 and a band limiting filter 282. The codec 280 converts the analogue signal to PCM A-law samples and outputs them to the switch on line 283.

Each codec 280 can also receive PCM A-law samples from the switch on line 285. The codec converts these to analogue signals and outputs them to the console via a droop compensation filter 286, band limiting filter 287 and line interface 288.

The signalling section interfaces with one of the ports and has in a UART and signalling logic circuit 290 a clock generator 291, and a current drive interface 292.

The circuit 290 comprises a General Instruments AY-5-1013 Universal Asynchronous Receiver/Transmitter which interfaces signalling from the CPU 25 with the console.

Figure 20A:
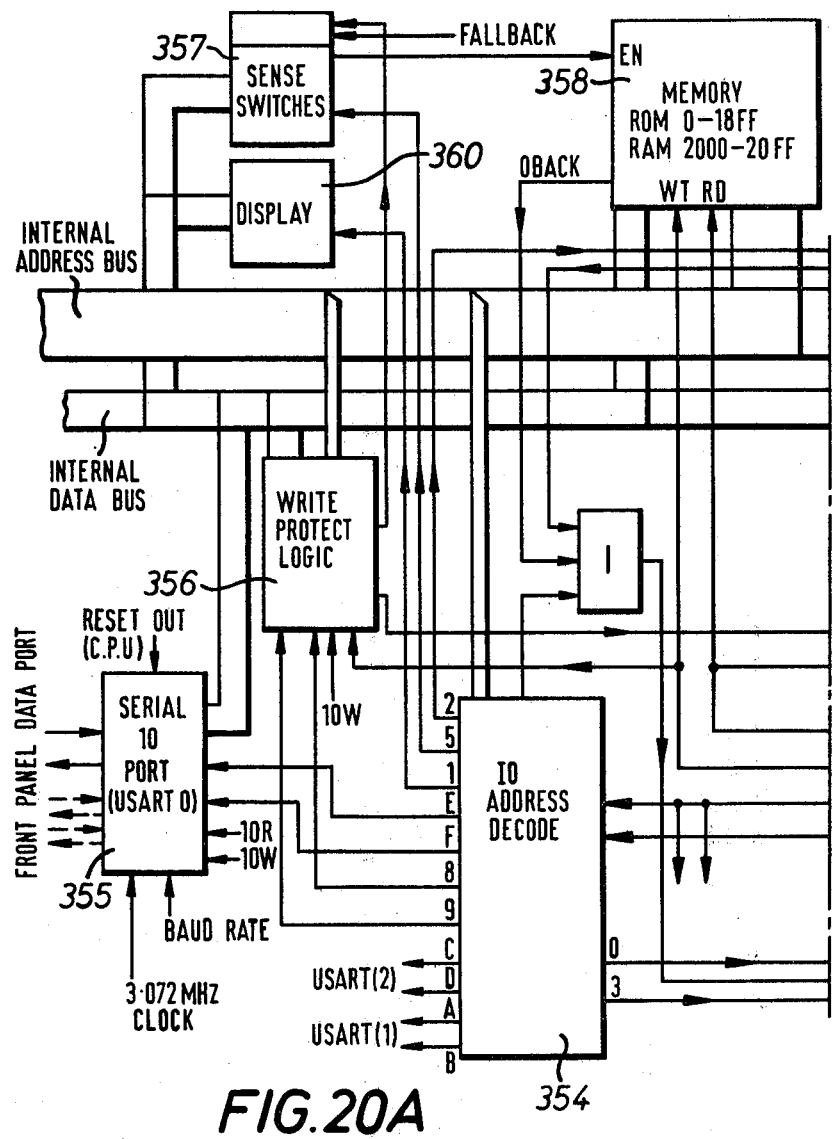
FIG. 20 is a block schematic diagram of the central processing unit.
Figure 20B:
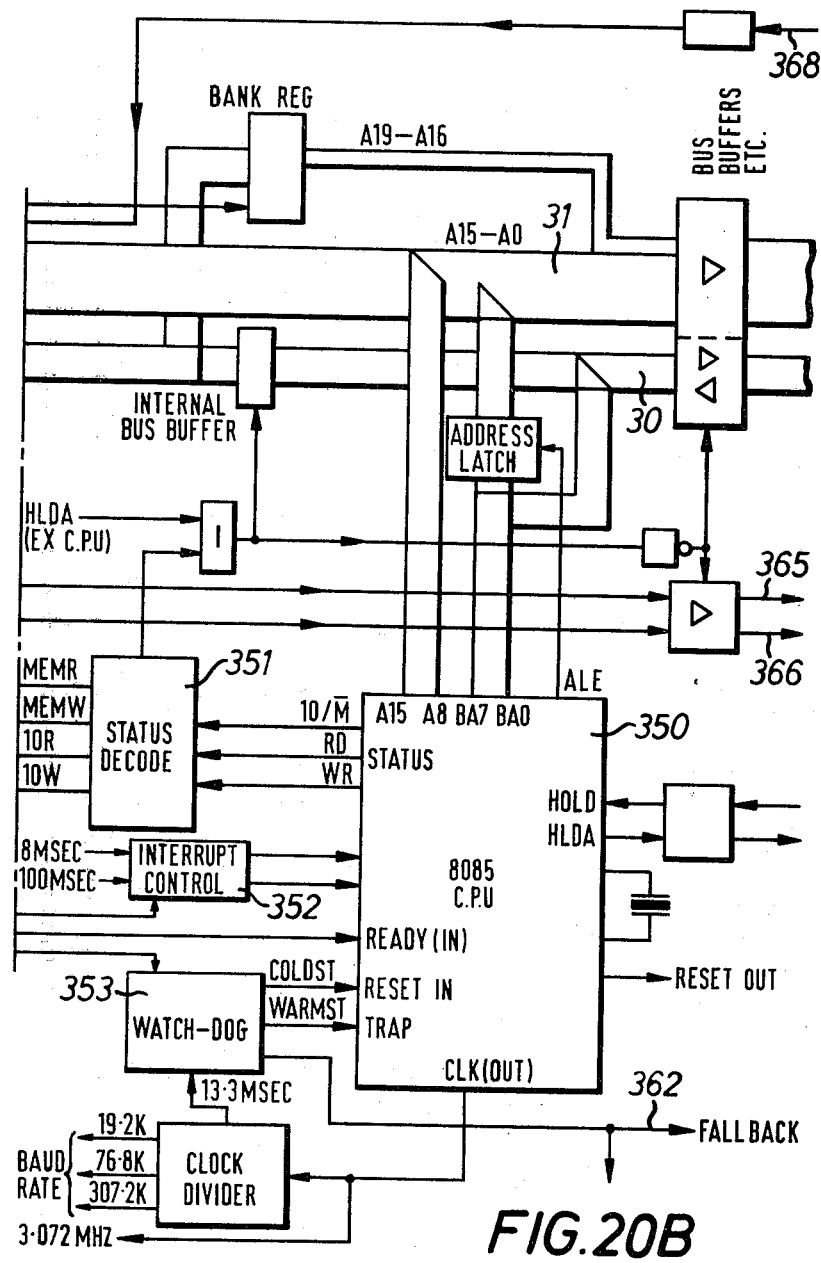

A block schematic diagram of the CPU 25 is shown in FIG. 20. The heart of the CPU is the Intel 8085 microprocessor 350 which can access directly the address and data buses 30, 31. Associated with the Intel 8085 are a status decode circuit 351, and interrupt control 352, a watch dog circuit 353, and input/output address decode circuit 354, a serial input/output port 355, write protect logic 356, sense switches 357, a memory 358 associated with the sense switches 357 and a two digit display 360. Several of these elements are commonly used with the Intel 8085. Their function and operation is described in the 8085 users manual and will therefore not be described in detail here.

The 8085 has its own internal clock with the interrupt control 352 providing 8 msec and 100 msec interrupts. The watch dog 353, which is externally driven via the address decode circuit 354, checks that the 100 msec interrupt is running. If the 100 msec clock misses more than once or twice the watch dog 353 interrupts the 8085 and initiates one of a number of restart routines. If these fail the fallback relays are operated in response to a signal on line 362.

The sense switches 357, which are connected as a port in a cabinet, can be operated to change the operating routine of the CPU. Generally the CPU operates according to routines stored in the memories 26, 27 and 28. However when it is required to check the CPU it is possible by operation of the sense switches 357 to initiate a testing routine stored in the memory 358. Fault information is displayed by the display 360.

Write signals for the memories 26, 27 and 28 appear on line 365 and read signals on line 366. Transfer acknowledge signals are returned to the CPU on line 368.

Figure 21:
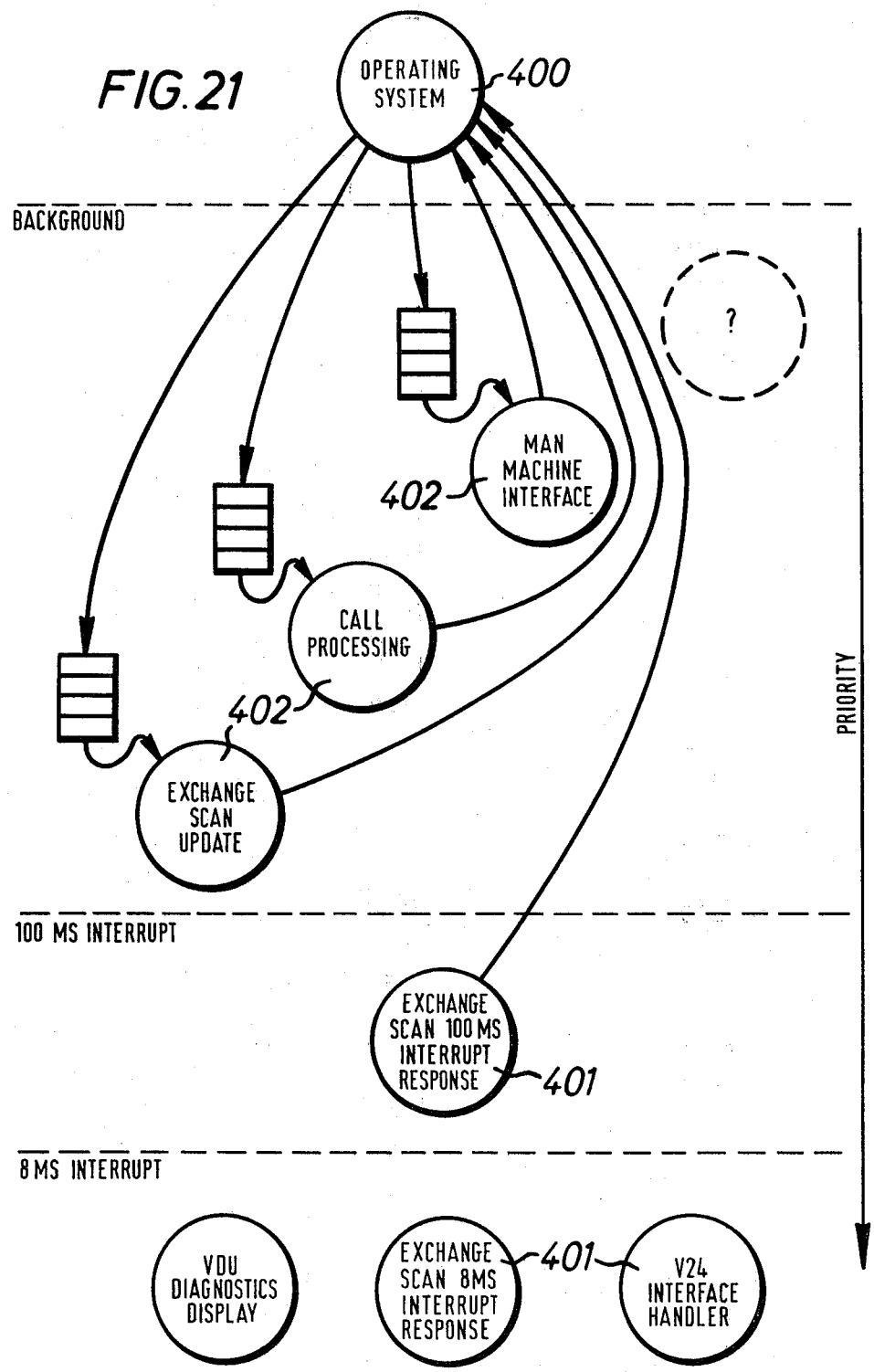

The structure of the device software is illustrated schematically in FIG. 21. Processing power is controlled by an operating system 400 and allocated to individual software modules in accordance with the system scheduling algorithms. The software modules are of two types, foreground (scanning) 401 and background 402. Foreground modules are further subdivided into those which must be performed at an 8 ms repetition rate and those at 100 ms repetition rate. The foreground modules are in general executed to completion whereas background modules may be temporarily suspended and other foreground or background modules executed before execution of the suspended module is recommenced.

Each background module performs an individual telephonic function (e.g. Call Processing, Call logging, etc.) and is referred to as an Applications Program (AP) or process. Each AP has a Process Number (PN) allocated to it which is used by the operating system to identify particular AP's.

The operating system provides a means of communication between processes in addition to a number of common services available to the background modules. Communication is effected by passing messages between A/Ps, an individual FIFO queue being allocated to each A/P. Although the foregound modules are not permitted to utilise the operating system services, the 100 ms scan modules are allowed to use the "SEND MESSAGE" facility.

Figure 22:
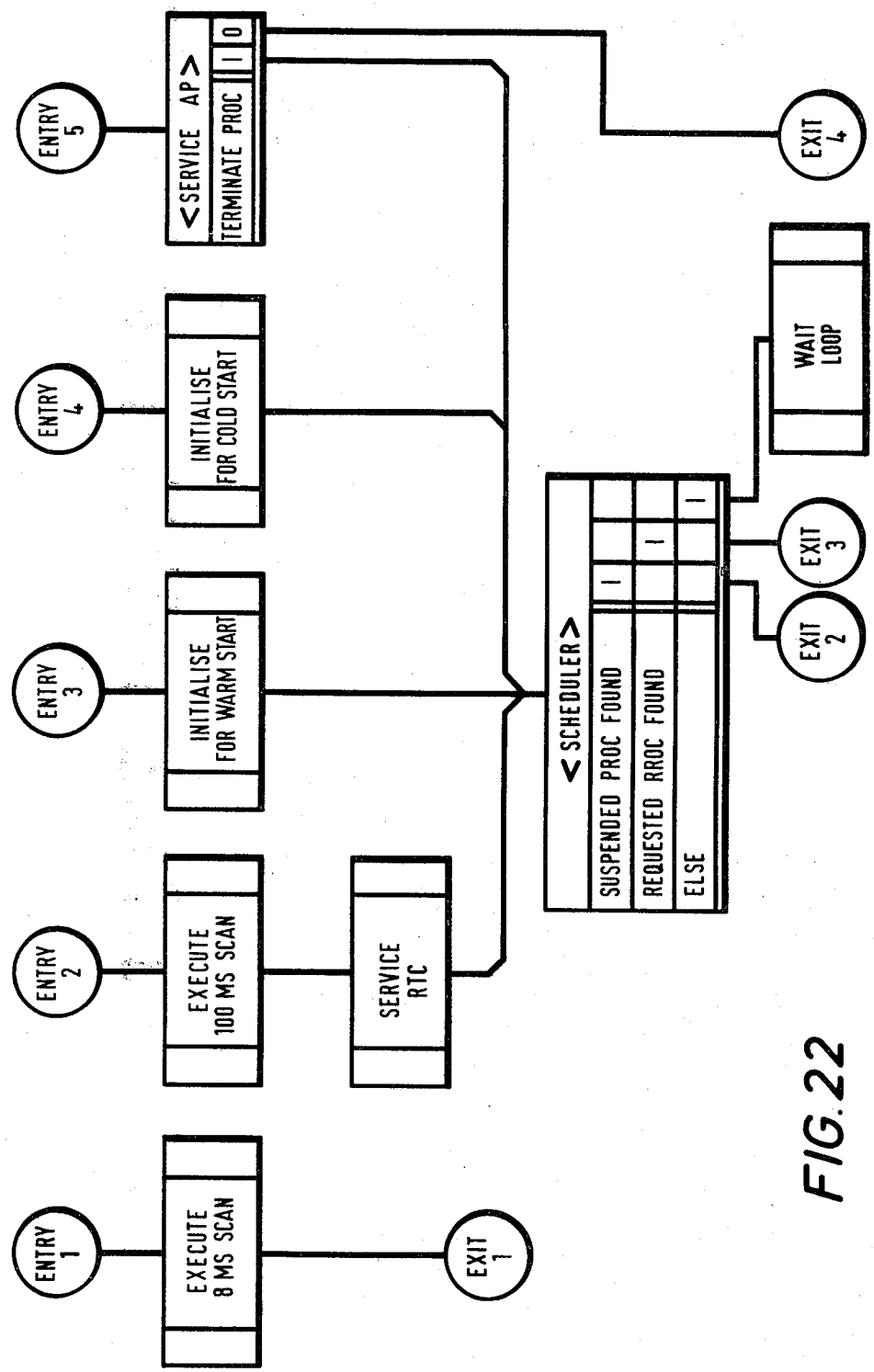

A top level diagram of the operating system is included as FIG. 22. The operating system has the following sections.

(1) Entry 1 routine which is entered on interrupt every 8 ms. The 100 ms interrupt is inhibited. The machine registers are stacked and the 8 ms scan routines executed. The tasks performed include the construction of both MF4 and loop-disconnect digits, VDU diagnostics display and the V24 interface handler. The machine registers are then restored and return made to the interrupted code via exit 1.

(2) Entry 2 routine which is entered on interrupt every 100 ms. If an AP has been interrupted then the machine registers are stacked and the AP suspended. The 100 ms scan routines are then executed. The complete exchange is scanned and any results recorded (e.g. NEW CALL, DIGIT, CLEAR etc. messages queued for action by Call Processing).

Next the Real Time Clock is updated, as are all timeouts currently running. Any timeouts found to have expired are queued for the relevant target process. The 100 ms period interrupt is enabled and entry made to the scheduler.

(3) Entry 3 routine which is entered on occurrence of a warm start interrupt. This interrupt is generated by a combination of hardware and software to indicate that a software error has been detected. All interrupts except the RESET (cold start) are inhibited and predetermined areas of the data base reinitialised. All interrupts are re-enabled and the scheduler entered.

(4) Entry 4 routine which is entered on occurrence of a RESET signal. This signal is generated on power-up or by activation of a front panel button. All interrupts are inhibited and predetermined areas of the data base initialised. The interrupts are re-enabled and the scheduler entered.

(5) Entry 5 routine which is entered by the execution of an operating system call by an Applications Program. The 100 ms interrupt is disabled and the particular operating system service requested executed. If the operating system service requested was "Terminate Process" than the 100 ms interrupt is enabled and the scheduler entered, otherwise the 100 ms interrupt is enabled and return made to the calling process via exit 4.

(6) A scheduler which is entered
   (a) after initialisation
   (b) after completion of the 100 ms exchange scan
   (c) after execution of a "Terminate Process" service A search is made for the highest priority process which is in the suspended state and if one is found then it is restarted via exit 2. If no process has previously been suspended then a search is made for the highest priority process which is dormant but has been requested (i.e. has a non-empty input queue). If one is found then it is started via exit 3. If there is no work to be done then the scheduler enters a wait loop until the next 100 ms interrupt arrives.

Figure 23C:
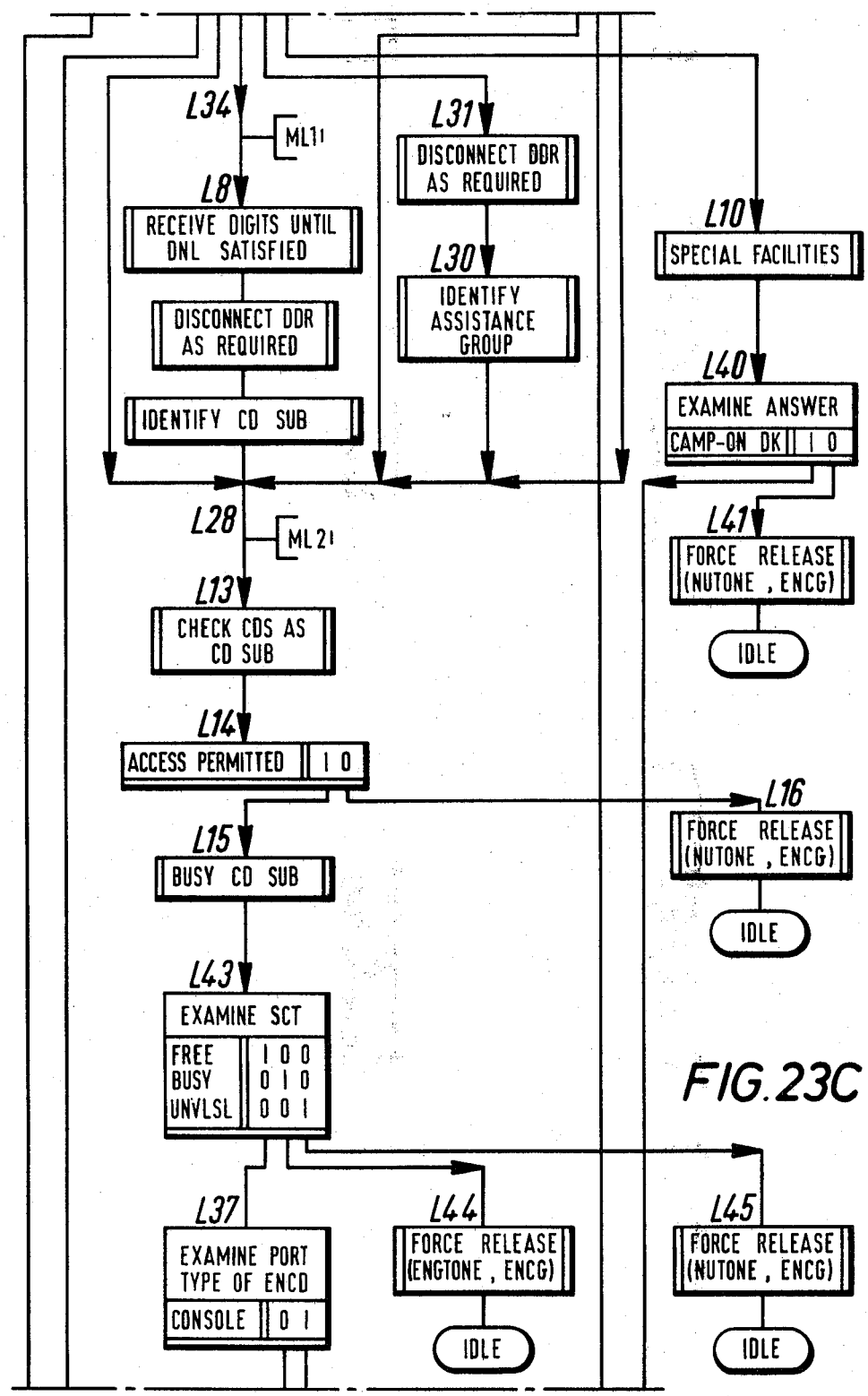
Figure 23D:
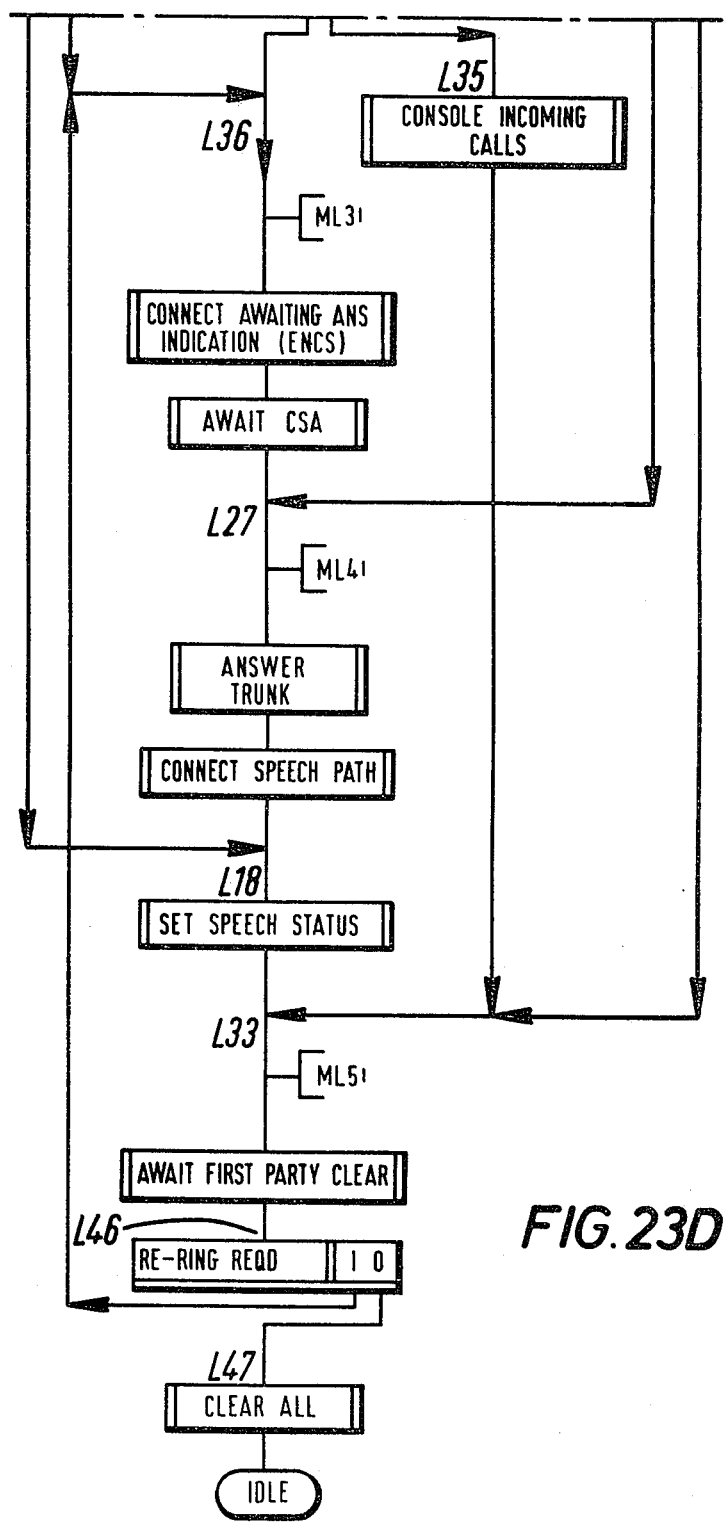

FIG. 23 is a schematic block flow diagram showing the steps involved in call processing telephonic functions.

We claim:
1. A digital switching device for switching digital signals under the control of a central control unit, said device comprising:
   a first stage adapted for connection to a plurality of ports including multiplexing means for multiplexing together signals received from said ports including both data signals and signalling informa- tion from each of said ports, means for separating data signals and signalling information into separate respective multiplexed channels, means for combining multiplexed data signals and signalling information, and demultiplexing means for selecting combined data signals and signalling information to be connected to each of said ports, signalling input means connected to receive and temporarily store signalling information separated by said first stage, signalling output means connected to receive and temporarily store signalling information to be combined by said first stage, an input time switching stage means arranged to receive multiplexed data signals from said first stage, said input time switching stage means being arranged under the control of the central control unit to transmit signals from a particular input port in a corresponding particular time slot on a highway, and an output time switching stage means for receiving signals from said input time switching stage means, said output time switching stage means being arranged to transmit data signals to said first stage for combination with signalling information and transmission to appropriate ports via said demultiplexing means.

2. A digital switching device as in claim 1 wherein said separating and combining means comprises a data reformatter section and a signalling reformatter section, each section including random access memory means which are alternately read and written.

3. A digital switching device as in claim 2 wherein said data reformatter section and said signalling reformatter section each comprise a pair of random access memories which are alternately read and written, the arrangement being such that one memory of each pair is read while the other is being written.

4. A digital switching device as in any one of claims 1 to 3 wherein said multiplexing means comprises one or more parallel in-serial out shift registers.

5. A digital switching device as in claim 4 wherein said demultiplexing means comprises one or more serial in-parallel out shift registers.

6. A digital switching device as claimed in any of claims 1, 2 or 3 wherein said input time switching stage means includes:

a data store having a data input, a serial to parallel converter means connected to the data input of said store, said converter means being arranged to receive data signals from said first stage, and a connection store means operative under the control of the central control unit to provide address signals to said data store whereby data is read out from said data store in said appropriate time slots.

7. A digital switching device as in any of claims 1, 2 or 3 wherein said output time switching stage means comprises a demultiplexer.

8. A digital switching device as in any of claims 1, 2 or 3 including signalling input and output circuit means for receiving signalling information from and transmitting signalling information to the first stage, each signalling circuit means including memory means accessible by said central control unit.

9. A digital switching device as in any of claims 1, 2 or 3 including a tone generator and conference unit connected to the input and output time switching stage means.

10. A digital switching device as in claim 6 wherein:

said output switching stage means includes a data store, a parallel to serial converter connected to receive data from said data store, and a connection store means operative under the central control unit to provide address signals to said data store to control reading of data from the store, and said device includes a space switching stage disposed intermediate the time switching stage means.

11. A digital switching device as in any of claims 1, 2 or 3 wherein said device is a PABX and the data signals are digitized speech samples.

12. A digital switching device as in claim 11 wherein said ports comprise subscriber line units and exchange line units of which includes a codec for converting between analogue and digital signals.

13. A digital switching device for switching speech-representing serial digital data signals intermingled with serial digital signalling information signals, to/from plural input/output ports under the control of a central unit, said device comprising:

multiplexing/demultiplexing means connected to said ports for multiplexing said serial digital signals to/from said ports, digital signal separation/combination means connected to said multiplexing/demultiplexing means for separating incoming data signals from incoming signalling information and for combining the thus separated signals to form respectively corresponding separated streams of digital signals and also for combining separate incoming streams of digital data signals and signalling information signals into an intermingled stream of serial digital signals, and time-space-time switch means connected to route said digital data signals from/to said ports via said separation/combination means and said multiplexing-/deumltiplexing means under control of said signalling information and said central unit.

14. A digital switching device as in claim 13 wherein said separation/combination means comprises a data reformatter section and a signalling reformatter section, each section including random access memory means which are alternately read and written.

15. A digital switching device in claim 14 wherein said data reformatter section and said signalling reformatter section each comprise a pair of random access memories which are alternately read and written, the arrangement being such that one memory of each pair is read while the other is being written.

16. A digital switching device as in any one of claims 13 to 15 wherein said multiplexing/demultiplexing means comprises one or more parallel in-serial out shift registers.

17. A digital switching device as in claim 16 wherein said demultiplexing means comprises one or more serial in-parallel out shift registers.

18. A digital switching device as in any of claims 13, 14 or 15 wherein said time-space-time switch means includes:

a data store having a data input, a serial to parallel converter means connected to the data input of said store, said converter means being arranged to receive data signals from said separation/combination means, and a connection store means operative under the control of the central control unit to provide address signals to said data store whereby data is read out from said data store in said appropriate time slots.

19. A digital switching device as in any of claims 13, 14 or 15 wherein said time-space-time switch means comprises a demultiplexer.

20. A digital switching device as in any of claims 13, 14 or 15 including signalling input and output circuit means for receiving signalling information from and transmitting signalling information to the separation/combination means, each signalling circuit means including memory means accessible by said central control unit.

21. A digital switching device as in any of claims 13, 14 or 15 including a tone generator and conference unit connected to the time-space-time switch means.

22. A digital switching device as in claim 18 wherein: said time-space-time switch means includes a data store, a parallel to serial converter connected to receive data from said data store, and a connection store means operative under the central control unit to provide address signals to said data store to control reading of data from the store.

23. A digital switching device as in any of claims 13, 14 or 15 wherein said device is a PABX and the data signals are digitized speech samples.

24. A digital switching device as in claim 23 wherein said ports comprise subscriber line units and exchange line units each of which includes a codec for converting between analogue and digital signals.

* * * * *